US011651181B2

(12) United States Patent
Leitermann et al.

(10) Patent No.: US 11,651,181 B2
(45) Date of Patent: May 16, 2023

(54) METHODS AND SYSTEMS FOR MANAGING INVENTORY THROUGH THE SUPPLY CHAIN AND LIFECYCLE OF A PRODUCT

(71) Applicant: Wavemark, Inc., Concord, MA (US)

(72) Inventors: Richard Eugene Leitermann, Arlington, MA (US); Brent Everett Koeppel, Natick, MA (US)

(73) Assignee: WAVEMARK, INC., Concord, MA (US)

( * ) Notice: Subject to any disclaimer, the term of this patent is extended or adjusted under 35 U.S.C. 154(b) by 0 days.

(21) Appl. No.: 17/362,430

(22) Filed: Jun. 29, 2021

(65) Prior Publication Data

US 2021/0326669 A1 Oct. 21, 2021

Related U.S. Application Data

(63) Continuation of application No. 16/543,246, filed on Aug. 16, 2019, now Pat. No. 11,055,591.

(60) Provisional application No. 62/726,635, filed on Sep. 4, 2018.

(51) Int. Cl.
| | | |
|---|---|---|
| G06K 19/07 | (2006.01) | |
| G06K 7/10 | (2006.01) | |
| H04W 4/35 | (2018.01) | |
| G06K 19/077 | (2006.01) | |

(52) U.S. Cl.
CPC ..... G06K 19/0724 (2013.01); G06K 7/10445 (2013.01); G06K 19/0776 (2013.01); H04W 4/35 (2018.02)

(58) Field of Classification Search
CPC .......... G06K 19/0724; G06K 7/10445; G06K 19/0776; H04W 4/35

USPC ......................................................... 235/385
See application file for complete search history.

(56) References Cited

U.S. PATENT DOCUMENTS

| | | | |
|---|---|---|---|
| 2007/0018819 A1* | 1/2007 | Streeb ................. | G06K 7/0008 340/572.1 |
| 2009/0073070 A1* | 3/2009 | Rofougaran ......... | H04B 5/0012 343/866 |
| 2012/0019363 A1 | 1/2012 | Fein | |
| 2013/0146669 A1 | 6/2013 | Almond et al. | |

(Continued)

FOREIGN PATENT DOCUMENTS

| | | |
|---|---|---|
| KR | 101602784 B1 | 3/2016 |
| WO | WO 2016/054177 A1 | 4/2016 |

OTHER PUBLICATIONS

International Search Report and Written Opinion issued by the International Search Authority corresponding to International Application No. PCT/US19/49473, dated Nov. 26, 2019.

*Primary Examiner* — Ahshik Kim
(74) *Attorney, Agent, or Firm* — ArentFox Schiff LLP

(57) ABSTRACT

Systems and methods for managing inventory, including one or more devices, such as computers or other terminal devices and/or computer systems, for managing inventory through the supply chain and lifecycle of a product. The system and method may include features for receiving the same or similar information associated with a plurality of products from a manufacturer, a distributor, and/or a consumer or other user, and associating various information, such as product location, quantity, and/or condition information with the products via one or more RFID devices operating at a plurality of frequencies, at any one or more locations, by any one or more devices, during the product lifecycle.

43 Claims, 18 Drawing Sheets

(56) References Cited

U.S. PATENT DOCUMENTS

| | | |
|---|---|---|
| 2015/0294210 A1 | 10/2015 | Martinez De Velasco Cortina et al. |
| 2016/0342883 A1 | 11/2016 | Huhtasalo |
| 2018/0285704 A1 | 10/2018 | Stewart et al. |
| 2020/0187689 A1* | 6/2020 | Baarman .................. H01Q 1/00 |

* cited by examiner

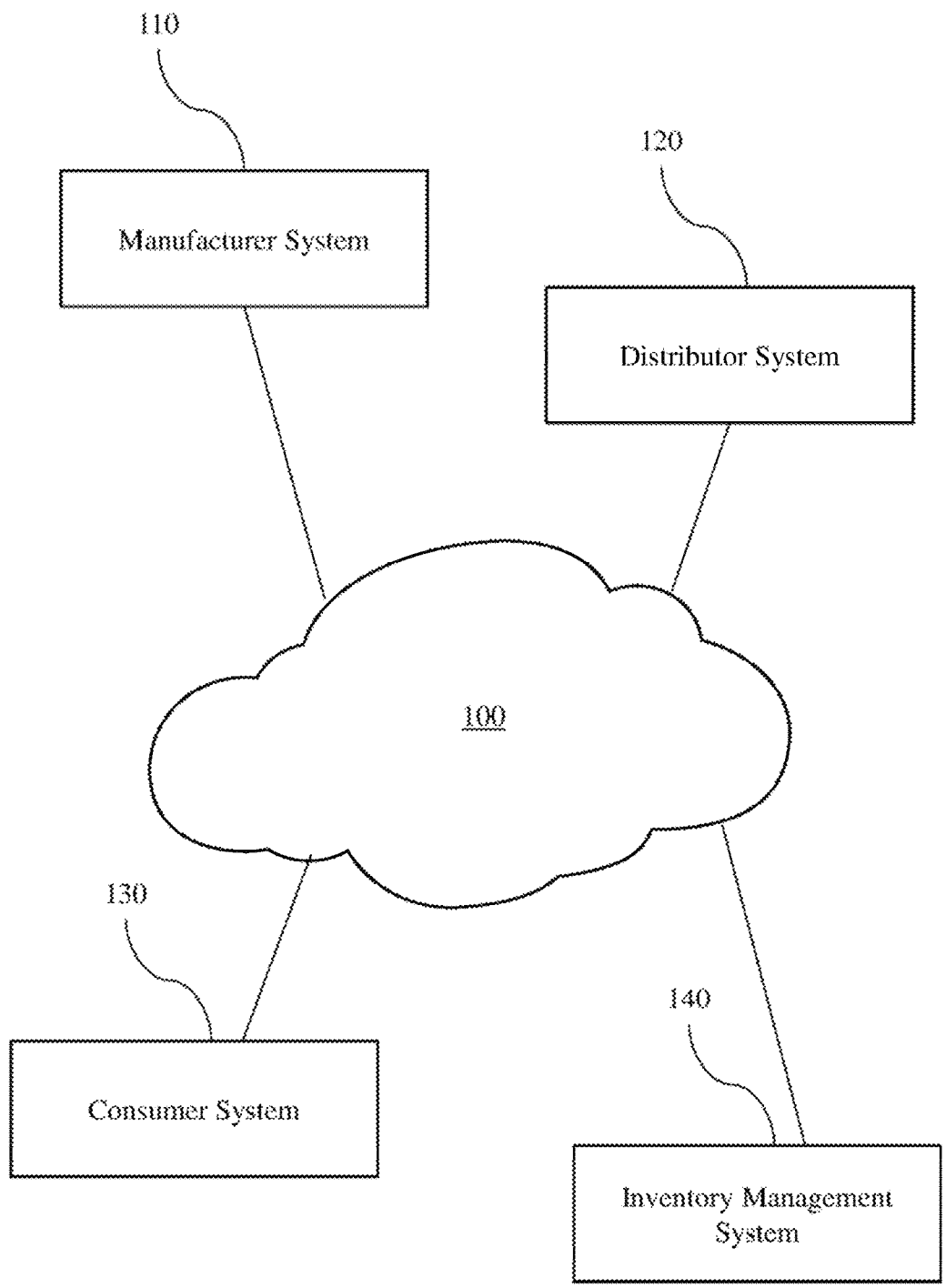

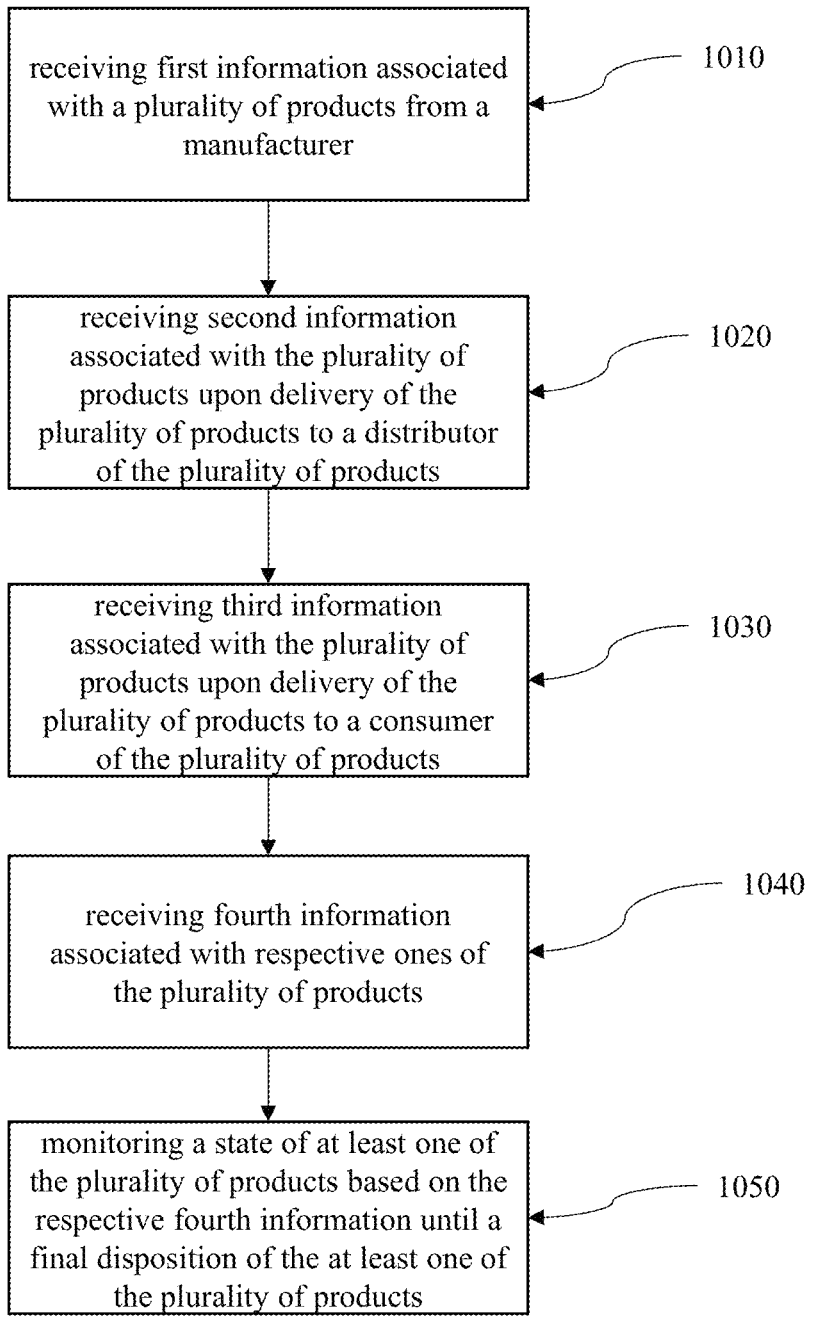

METHODS AND SYSTEMS FOR MANAGING INVENTORY THROUGH THE SUPPLY CHAIN AND LIFECYCLE OF A PRODUCT

CROSS-REFERENCE TO RELATED APPLICATIONS

This application is a continuation of U.S. patent application Ser. No. 16/543,246, filed Aug. 16, 2019, which claims priority to and the benefit of U.S. Provisional Application No. 62/726,635, filed Sep. 4, 2018. The disclosures of each of the priority applications are hereby incorporated in their entirety by reference.

TECHNICAL FIELD

Aspects of the present disclosure are directed to systems and methods for managing inventory through the supply chain and lifecycle of a product.

BACKGROUND AND SUMMARY

This background and summary are provided to introduce a selection of concepts in a simplified form that are further described below in the DETAILED DESCRIPTION. This background and summary are not intended to identify key features of the claimed subject matter, nor is it intended to be used as an aid in determining the scope of the claimed subject matter.

Radio frequency identification (RFID) tags are frequently used to identify and track objects. For example, RFID tags may be attached to any object that may be tracked. RFID tags may uniquely identify their host object using a pre-programmed tag identifier (TID), which may be a unique serial number assigned by the chip manufacturer, and the RFID tags may include a memory bank to store the items' unique tracking identifier, such as an electronic product code (EPC).

Common types of RFID tags include low frequency (LF), high frequency (HF) RFID tags and ultra-high frequency (UHF) RFID tags. LF RFID tags generally operate at a frequency of about 30 KHz to 300 KHz, and may only be scanned by a reader within extremely close proximity to the LF RFID tag, e.g., approximately less than 10 cm. HF RFID tags generally operate at a frequency of about 3 to 30 MHz, and may only be scanned by a reader within close proximity to the HF RFID tag, e.g., approximately between 10 cm and 1 m. UHF RFID tags generally operate at a frequency of about 300 MHz to 3 GHz, and may be scanned from a greater distance than HF RFID tags, i.e., a distance of up to approximately 12 m. Inventory tracking systems may be based on LF RFID tags, HF RFID tags or UHF RFID tags, for example. When implementing an inventory system, designers may consider among factors:

1) Do the tags need to be scanned over a greater distance?
2) How will the RFID tags be used, e.g., will they be placed near liquids, metals, carbon substances, temperature conditions, or other dielectric and conducting objects?
3) How much data storage is required in the memory onboard the RFID tags?
4) How many RFID tags need to be scanned at one time?
5) Will the RFID tags be located near high amounts of Electromagnetic Interference (EMI), such as EMI emitted by motors, robots on assembly lines, conveyors with nylon belts, etc.
6) Do the RFID tags need to be capable of faster data transfer?
7) How much power usage is required?

Aspects of the present disclosure relate to systems and methods for managing inventory. Such systems and methods may include one or more devices, such as one or more computers or other terminal devices and/or computer systems for managing inventory through the supply chain and lifecycle of a product. The system may include features for receiving first identification information of an RFID tag read at a first location via one or more of a plurality of RFID protocols, receiving characteristic information, such as product name, serial number, and/or description from a manufacturer, a distributor, and/or a consumer, among other information, and associating the characteristic information with the first identification information. The system may further include features for receiving second identification information of the RFID tag read at a second location via a different one or more of the plurality of RFID protocols, receiving additional characteristic information obtained from a different manufacturer, distributor, and/or consumer, and based on a correlation between the second identification information and the first identification information, associating the additional characteristic information with the first identification information.

Additional advantages and novel features of these aspects will be set forth in part in the description that follows, and in part will become more apparent to those skilled in the art upon examination of the following or upon learning by practice of the disclosure.

BRIEF DESCRIPTION OF THE DRAWINGS

The novel features believed to be characteristic of implementations of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further features and advances thereof, will be best understood by reference to the following detailed description of illustrative implementations of the disclosure when read in conjunction with the accompanying drawings, wherein:

FIG. 1 illustrates an example network for managing inventory through the supply chain and lifecycle of a product in accordance with aspects of the present disclosure;

FIG. 17A illustrates a flowchart of one example implementation for managing inventory through the supply chain and lifecycle of a product in accordance with aspects of the present disclosure;

DETAILED DESCRIPTION

Figure 2A:
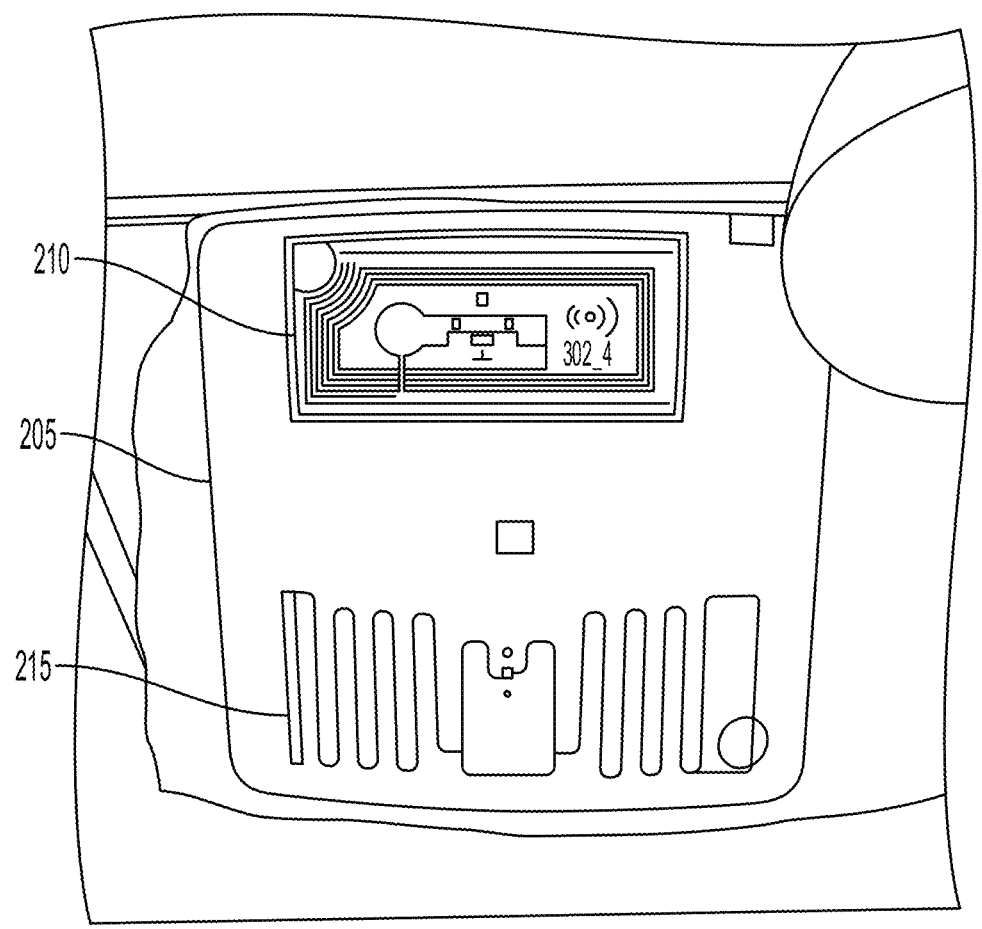
FIG. 2A illustrates various features of an example dual frequency RFID tag for use in conjunction with aspects of the present disclosure.

The following includes definitions of selected terms employed herein. The definitions include various examples and/or forms of components that fall within the scope of a term and that may be used for implementation. The examples are not intended to be limiting.

A "processor," as used herein, processes signals and performs general computing and arithmetic functions. Signals processed by the processor may include digital signals, data signals, computer instructions, processor instructions, messages, a bit, a bit stream, or other computing that may be received, transmitted and/or detected.

A "bus," as used herein, refers to an interconnected architecture that is operably connected to transfer data between computer components within one or more systems. The bus may be a memory bus, a memory controller, a peripheral bus, an external bus, a crossbar switch, and/or a local bus, among others. The bus may also be a bus that interconnects components inside a system using protocols, such as Controller Area network (CAN), Local Interconnect Network (LIN), among others.

A "memory," as used herein may include volatile memory and/or non-volatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and/or direct RAM bus RAM (DRRAM).

An "operable connection," as used herein may include a connection by which entities are "operably connected," is one in which signals, physical communications, and/or logical communications may be sent and/or received. An operable connection may include a physical interface, a data interface and/or an electrical interface.

Generally described, aspects of the present disclosure provide systems and methods for managing inventory through the supply chain and lifecycle of a product. For instance, an example system in accordance with aspects of the present disclosure may provide for seamless visibility of products flowing from supply chain to consumption. This visibility may be achieved using a dual frequency RFID tag that may provide analytics and insights into the supply chain and lifecycle of products tagged with the dual frequency RFID tag, among other features. Additionally, the example system may track a variety of products from various origins and points of entry into the system having a variety of RFID tag types affixed to the products. That is, the system may track products having any one of a combination of LF RFID tags, HF RFID tags, and/or UHF RFID tags. Furthermore, the example system may dynamically and automatically adapt to various product types, tags, and reader environments, among other features, in order to facilitate seamless inventory tracking and reporting. Types of products that may be managed through the supply chain and lifecycle may include, for example, medical equipment, medical devices, pharmaceuticals, consumable goods, and the like.

RFID tags are frequently used to identify and track objects. For example, RFID tags may be attached to any suitable object that may be tracked. RFID tags, interchangeably referred to herein as "tags," generally take the form of integrated circuits, with associated antennas, that have computer readable memory that may be encoded with identification information, such as a unique serial number (USN), which may also be referred to interchangeably herein as a unique identification number, unique digital identifier, universal identifier, or "UID." Identification information, such as a UID, may be burned into a read-only memory of the tag at the time the tag is manufactured to ensure that each tag has a unique serial number. However, in accordance with some aspects of the disclosure, the UID may be changed, edited or provided with additional information. The identification information may include information about the tag itself, such as the manufacturer of the tag, date of manufacture, lot number, tag configuration, etc. Typically, when an RFID tag is interrogated, the tag responds by emitting a data signal that includes the tag's UID, which is captured by the reader.

The UID typically is or includes a number that does not alone contain characteristics of the tag or an object with which the tag is associated. However, characteristic information may be associated with the UID in a database, such that the UID may be used to access information about the tag and/or an object associated with the tag. The characteristic information may also include information about an object associated with the tag, such as an individual product on which the tag is affixed. This characteristic information may include any information about the item, such as a product serial number, name, product code, description, manufacturer, date of manufacture, lot number, features, capabilities, expiration date, whether the item has been refurbished, etc. Additionally, the characteristic information may include event information, such as a date and time a tag was read, the type and location of the reader that read the tag, a status indicator (such as an indication that the tag or an associated object is in storage or use or has been consumed), etc.

Characteristic information may be stored in a memory of the tag itself, but typically may be stored in a database separate from the tag such that the characteristic information may be accessible at any time without having to contemporaneously read the information directly from the tag. For example, the characteristic information may be stored in a database of an inventory management system, a manufacturer system, a distributor system, and/or a consumer system, among other systems, as described in in detail below, so that such information may be accessed, processed, and updated, along with characteristic information about other tags, for example. The inventory management system, the manufacturer system, the distributor system, and/or the consumer system, as described in in detail below, may use a set of UIDs read from tags at a specific inventory location to determine what products and what quantities of each product type are on-hand at that location, for example.

FIG. 1 illustrates an example network for managing inventory through the supply chain and lifecycle of a product in accordance with aspects of the present disclosure. For example, a network may include a manufacturer system 110, a distributor system 120, a consumer system 130, and an inventory management system 140. For example, network 100 may be used to facilitate communications among multiple systems, including the manufacturer system 110, the distributor system 120, the consumer system 130, and the inventory management system 140. In some implementations, some or all of the systems may be in a single general physical location or may be in or include one or more remote locations (e.g., be cloud based). For example, the manufacturer system 110, the distributor system 120, and the consumer system 130 may be located in different or the same physical locations, and the inventory management system 140 may be located in the cloud, and accessed by users at different locations, as shown with respect to FIG. 19, and described in conjunction therewith. In some implementations, the network 100 may include the Internet or another Internet Protocol (IP) based network. The manufacturer system 110, the distributor system 120, the consumer system 130, and the inventory management system 140 may include one or more computer systems, which may include one or more terminals having various features as shown with respect to FIG. 18 and FIG. 19, for example, and described in conjunction therewith. In some implementations, the manufacturer system 110, the distributor system 120, the consumer system 130, and the inventory management system 140 may also include a memory that stores instructions for executing processes for managing inventory through the supply chain and lifecycle of a product, and a processor configured to execute the instructions.

In another aspect of the disclosure, each of the manufacturer system 110, the distributor system 120, and the consumer system 130 may comprise separate and discrete databases or other data repositories, which may comprise the UID correlated with characteristic information. Each of databases/data repositories 110, 120 and 130 may be or include a private database and may be accessible only to the specific system collecting, managing, and maintaining the database. For example, as described above, the manufacturer system 110 may collect information from tags scanned during the manufacturing process, such as UID 12345, which may be attached to a biopsy device with serial number XXX. For example, as described above, the consumer system 130 may collect information from tags scanned during use and placement at a facility, such as UID 12345, which may be located in location Z at time 08:01 AM. In another aspect of the disclosure, some or all of the manufacturer system 110, the distributor system 120, and the consumer system 130 may allow data sharing and access to the inventory management system 140. For example, the inventory management system 140 may query the manufacturer system 110 to obtain the data that indicates UID 12345 is attached to a biopsy device with serial number XXX, and then may query the consumer system 130 to obtain the additional data that indicates that UID 12345 was located at location Z the last time it was scanned, at 08:01 AM.

Figure 3:
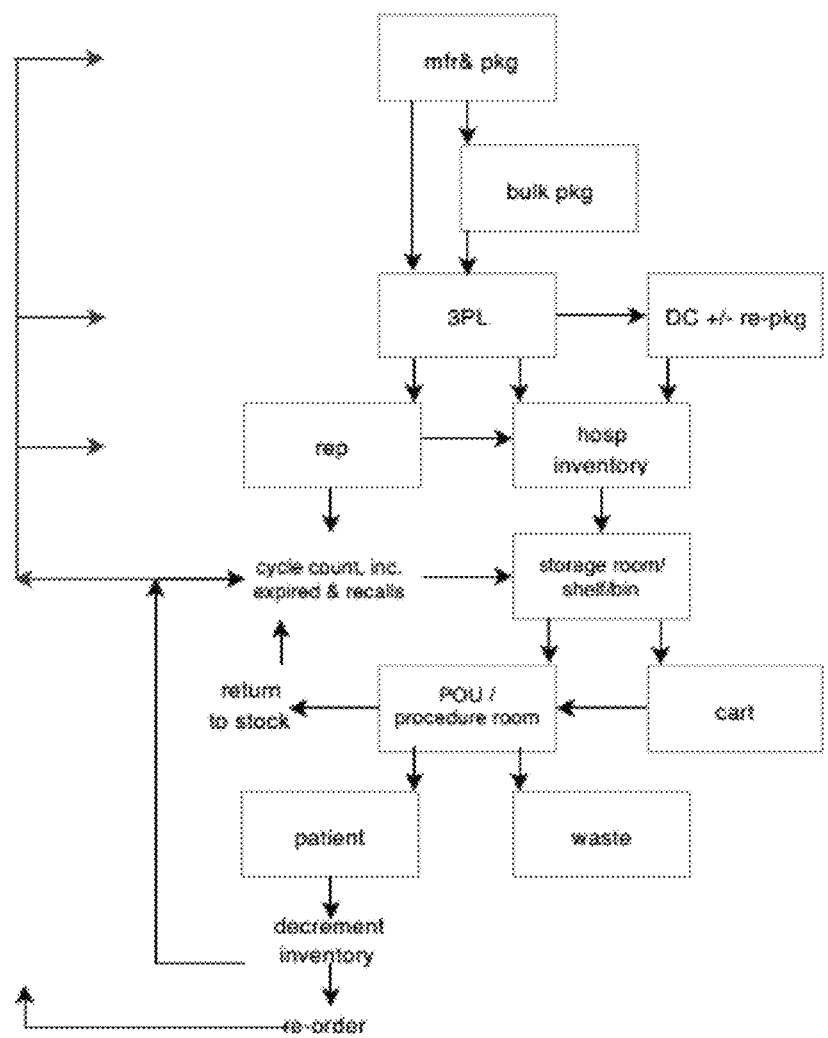
FIG. 3 illustrates various features of an example supply chain for use in conjunction with aspects of the present disclosure.

In some implementations, as described above through the database sharing example, the inventory management system 140 may track one or more products tagged with an RFID tag through the supply chain. For example, the supply chain may include various activities, phases and/or features in the product lifecycle, including for example, manufacturing, packaging, transportation, distribution, inventory, consumption, and disposal, as illustrated in FIG. 3. Each of these activities, phases, and/or features of the supply chain may be associated with a location or feature equipped with one or more different types of RFID reader devices. Some examples of RFID readers include handheld scanners for users to scan locations, fixed scanners located within a device to scan specific locations, and fixed scanners within large locations to scan large locations. In order to afford compatibility with a number of different types of RFID reader devices, a number of different types of RFID tags, and/or a number of different operating environments, the products may be tracked using multiple different RFID protocols, thereby enabling seamless item-level identification and management/tracking of the products throughout the supply chain, for example. The different RFID protocols generally use one or more frequency bands, which may be referred to generally as LF, HF, and UHF. As used herein and unless otherwise indicated, the term "dual frequency" refers to two or more RFID protocols, each of which may implement different or overlapping frequency bands. Thus, the term "dual frequency" encompasses "tri frequency" and "multiple frequency." The term "dual frequency RFID tag" thus refers to a tag that is capable of communicating via at least two RFID protocols and may additionally be capable of communicating via a third RFID protocol and/or additional numbers of RFID protocols. For example, a dual frequency RFID tag may communicate via both a first RFID protocol that implements a HF frequency band and a second RFID protocol that implements an UHF frequency band. In addition to the HF RFID protocol and the UHF RFID protocol, the dual frequency RFID tag may communicate via a third RFID protocol that implements a LF frequency band. Some example protocols may be ISO 14443, ISO 15693, ISO 18000-3, ISO 1800-6C, and ISO-24730. Additionally, near-field communication (NFC) protocols may also be implemented. The inventory management system 140 described herein may thus provide, for example, an integrated, end-to-end solution for RFID compatibility throughout the supply chain and lifecycle of any tagged product from any point of entry to any point of exit. As described in more detail below, the RFID tags and the UID provided therein may be "read," by implementing the protocols of the one or more frequency bands, UHF, HF and/or LF via a RFID reader.

There are two main types of RFID systems, active RFID systems and passive RFID systems. In active RFID systems, the RFID tags may have their own transmitter and power source, for example, a battery. Active RFID tags may broadcast their own signal to transmit information stored on their microchips, as described above, to RFID readers, for example. Further, there are two main types of active tags: transponders and beacons. Transponders may be "woken up" when they receive a radio signal from a RFID reader, and then may power on and respond by transmitting a signal back to the RFID reader. Unlike transponders, beacons are not powered on by the RFID reader's signal. Instead, beacons may emit signals at pre-set intervals. For example, depending on the level of locating accuracy required by a system, beacons may be set to emit signals every few seconds, once a day, or at any other time interval. Each beacon's signal may be received by RFID reader antennas, and may communicate the RFID tag's ID information and position. In passive RFID systems, the RFID reader and the RFID reader antenna may send a radio signal to the RFID tag. The RFID tag may then use the received signal from the RFID reader to power on and reflect energy back to the reader. Passive RFID systems can operate in the LF, HF, or UHF radio bands. Passive RFID tags do not require a power source or transmitter, and only require a tag chip and antenna. Passive RFID tags may be packaged in many different ways, as described below, depending on the specific RFID application requirements. For example, passive RFID tags may be mounted on a substrate, or sandwiched between an adhesive layer and a paper label. Passive RFID tags may also be embedded in a variety of devices or packages to make the tag resistant to extreme temperatures or harsh chemicals, among other things.

In order to track a product throughout the supply chain, a product or item may be tagged with a dual frequency RFID tag. In some implementations, the dual frequency RFID tag may be provided to the product's manufacturer by a purveyor of the inventory management system 140. For example, the dual frequency RFID tag may be applied by the manufacturer to a product using an applicator device that may uniquely register or position the dual frequency RFID tag onto a specific location on a package during affixation. In another aspect of the disclosure, the dual frequency RFID tag may be provided by the purveyor of the inventory management system 140, and the tag may be affixed to the product at any point in the product's life cycle, for example, at the distributor, consumer site, etc. This process of affixing and registering the dual frequency RFID tag may be conducted via one or more of the systems shown in FIGS. 18 and 19, as described in more detail below. In some implementations, this attachment operation may be achieved using an edge guide or a corner stop, for example, to align the applicator device, and hence the dual frequency RFID tag, to the package. In some implementations, the dual frequency RFID tag may be applied to a packaged product rather than the physical product itself at any time during the product's life circle.

As described above, in some implementations, the dual frequency RFID tag that is provided by the purveyor of the inventory management system 140, may be applied to the product itself or the packaging of the product during any point in the product's lifecycle. In one aspect of the disclosure, the dual frequency RFID tag may be applied at any point during the manufacture process, the distribution process, and/or the consumer process. Upon affixing the dual frequency RFID tag to the product or packaging of the product, the dual frequency RFID tag may be read by an RFID reader, which obtains a UID, and the UID may be registered in a respective database, along with other characteristic information. For example, if a dual frequency RFID tag is registered during the manufacturing process, the RFID tag's UID may be registered at the manufacturer system 110. As described above, each system 110, 120, 130 may contain its own database, and each may be implemented with different RFID readers operating on different frequencies, for example. In one aspect of the disclosure, the dual frequency RFID tag supplied by the purveyor of the inventory management system 140, may provide tags comprising at least one frequency band for which the affixer and registrar have equipment for interaction. For example, the manufacturer may have RFID readers that operate only on the UHF band, and the distributor may have RFID readers that operate only on the LF band. Thus, the purveyor may supply dual frequency RFID tags to the manufacturer for affixing and registration that comprise RFID elements that operate on the LF band and the UHF band. To this end, the manufacturer of the product may affix the dual frequency RFID tag and register the RFID tag UID, for example 9876, to the manufacturer system 110 using UHF RFID readers. As described above, the database may correlate the UID read from the RFID element in the UHF range with additional characteristic information provided by the RFID reader, and store this additional characteristic information in the database along with the UID. For example, the manufacturer system 110 may store UID 9876 as a catheter.

Further, the distributor may obtain the product from the manufacturer and may be able to read the same dual frequency RFID tag comprising the same UID 9876 through the use of a LF RFID reader. Further, as described above, the distributor system 120 database may correlate the UID read from the RFID element in the LF range with additional characteristic information provided by the RFID reader, and store this additional characteristic information in the database along with the UID 9876. For example, the distributor system may store UID 9876 as being received at 06:07 PM on Jan. 1, 2019.

As described in the example above, although the distributor system 120 may not have access to the manufacturer system 110 containing the database with the UID and the additional characteristic information, the distributor system may register the UID 9876 in the distributor system 120 containing its own database. As described below, each discrete database stored on a respective system may or may not be shared among systems 110, 120, 130 and 140, or may only be shared from 110, 120, and/or 130 with system 140.

In one aspect of an example implementation in accordance with aspects of the disclosure, for example, the manufacturer system 110 that registered and stored UID 9876 as a catheter may communicate with distributor system 120. Upon receipt of the product by the distributor from the manufacturer, the dual frequency RFID tag comprising the same UID 9876 is read through the use of a LF RFID reader. The distributor system 120 may query manufacturer system 110 and determine that UID 9876 is registered as a catheter. The distributor system may, for example, register UID 9876 in the distributor system 120 database as a catheter that was received and had its tag read at 06:07 PM on Jan. 1, 2019. In another example, distributor system may, for example, update UID 9876 in the manufacturer system 110 database as being received and had its tag read at the distributor at 06:07 PM on Jan. 1, 2019.

In another aspect of the disclosure, each system 110, 120 and 130 may communicate with each other and/or with inventory management system 140. For example the manufacturer system 110 may register and store UID 9876 as a catheter in its database of the manufacturer system 110, but also communicate that information to the database of inventory management system 140. Upon receipt of the physical product by the distributor from the manufacturer, the dual frequency RFID tag comprising the same UID 9876 may be read, as described above, and the distributor system 120 may query the inventory management system 140 and determine that UID 9876 is registered as a catheter. The distributor system may, for example, register UID 9876 in the distributor system 120 database as a catheter that was received and read at 06:07 PM on Jan. 1, 2019. In another example, the distributor system 120 may, for example, update UID 9876 in the inventory management system 140 database as being received at the distributor at 06:07 PM on Jan. 1, 2019. Thus, each system 110, 120 and 130 may, for example, locally store its own data in a database without interaction, locally store its own data in a database with data sharing enabled among systems, locally store in its own database with data sharing among systems with editability, or locally store its own data in a database and share data with the inventory management system 140, etc.

In one aspect of the disclosure, the UID or any information/data contained on the RFID element may be the same or may be different among RFID elements operating at different frequencies of the dual frequency RFID tag. For example, as described below, RFID elements operating at different frequencies may comprise additional data blocks based upon industry standards. In one aspect of the disclosure, although each RFID element may comprise a different number of data blocks, each RFID element may still contain at least the same UID. For example, an UHF RFID element may comprise additional data blocks and thus may contain data XXX12345 (where the UID data is 12345), while LF RFID element may comprise less data blocks and thus may contain only the UID data 12345. In another aspect of the disclosure, as described below, the additional data blocks may provide additional information in conjunction with the UID, for example, the specific name or identity of the manufacturer of the product, whether the product has been refurbished, whether the product needs to be maintained at a specific temperature, etc.

As illustrated in FIG. 2A, one example dual frequency RFID tag 205 may include, for example, a HF RFID element 210 and an UHF RFID element 215, as shown. Additionally, the dual frequency RFID tag 205 may also include a LF RFID element, not shown. Any combination of the LF, HF and/or UHF elements may be implemented in the dual frequency RFID tag 205. In some implementations, the HF element 210 and the UHF element 215 may be encapsulated within the same tag. In some implementations, the LF element and the UHF element 215 may be encapsulated within the same tag. In some implementations, the HF element 210 and the LF element may be encapsulated within the same tag. In some implementations, the HF element 210, the UHF element 215 and the LF element may be encapsulated within the same tag. In other implementations, the LF element, the HF element 210 and the UHF element 215 may be encoded with the same identification (e.g., UID) number, such that only one of the elements needs be read at any location or point in time in order to identify the tagged product. For example, the HF element 210 may include a sixteen (16) digit memory bank that may be encoded with a product identifier, whereas the UHF element 215 may include a twenty-four (24) digit memory bank that may be encoded with the same 16 digit product identifier as the HF element 210, while also affording 8 additional digits that can be encoded uniquely during production. For example, the UHF element 215 may be encoded with additional information, such as specification of the supplier of the tag (e.g., for authentication or source traceability), the customer that purchased the tag, any characteristics corresponding to the production of the tag, etc. As further examples, the 8 additional digits may be encoded with information indicating the cold-chain integrity of a product, e.g., for tags usable for cold-chain environments, whereby the encoded information indicates that that product is temperature-sensitive and/or requires special handling or routing, authenticity information, e.g., a distributor of the product, a vintage of the tag, e.g., when and who manufactured the tag, and owner identity of the tag, e.g., an entity to which that tag was allocated to or procured from. In some instances, the additional 8 digits may be encoded at the beginning of the lifecycle of the tag and remain in permanent tag memory, as will be understood by those of ordinary skill in the relevant arts. In some instances, the additional 8 digits may be encoded or changed at different points of the lifecycle as characteristics of the product may change. For example, the 8 digits may indicate the product was previously used, partially used, refurbished, etc.

As illustrated in FIG. 2A, one example dual frequency RFID tag 205 may include, for example, an HF RFID element 210 and an UHF RFID element 215, as shown. Additionally, the dual frequency RFID tag 205 may also include a LF RFID element (not shown in FIG. 2A). Any combination of the LF, HF. And/or UHF elements may be implemented in the dual frequency RFID tag 205. In some implementations, the HF element 210 and the UHF element 215 may be encapsulated within the same tag. In some implementations, the LF element and the UHF element 215 may be encapsulated within the same tag. In some implementations, the HF element 210 and the LF element may be encapsulated within the same tag. In some implementations, the HF element 210, the UHF element 215, and the LF element may be encapsulated within the same tag. In other implementations, the LF element, the HF element 210 and the UHF element 215 may be encoded with the same identification (e.g., UID) number, such that only one of the elements needs be read at any location or point in time in order to identify the tagged product. For example, the HF element 210 may include a sixteen (16) digit memory block that may be encoded with a product identifier, whereas the UHF element 215 may include a twenty-four (24) digit memory block that may be encoded with the same 16 digit product identifier as the HF element 210, while affording 8 additional digits that can be encoded uniquely during production, per the discussion above.

In some implementations, one or more notifications may be generated based on information extracted from the dual frequency RFID tag 205. For example, in some implementations, the additional 8 digits of the UHF element 215 may be encoded with information relevant to inventory management and tracking, which may be used, for example, to trigger a notification. For example, the notification may be or include an onscreen popup in real-time on a user-interface (UI) of an RFID reader, such as a mobile RFID reader, as described in accordance with FIG. 18 and FIG. 19 below, or a status message connected to a line item of an inventory management system 140, which may be displayed on a UI of a computing device, such as a mobile device, laptop, tabletop, or desktop computer, server, etc. as described in accordance with FIG. 18 and FIG. 19 below. Alternatively, or additionally, the notification may be generated in response to the absence of correct or interpretable information with regard to the 8 additional digits. For example, the notification may be generated when the 8 additional digits indicate that the tag/product was not distributed by a given distributor or does not belong to a given consumer, despite its presence at such location. Alternatively, or additionally, the notification may be generated when a tagged product may be at risk, and as such, should be returned to the manufacturer or destroyed, for example. In further aspects, the additional 8 digits may be used to encode information to be stored by an inventory management system 140 and provided to a user in an inventory report that may be generated periodically, e.g., daily, weekly, monthly, or as requested by the user.

In some implementations, the systems 110, 120, 130 and 140 and their respective databases may store the information encoded on each of the LF element, the HF element 210, and/or the UHF element 215, as well as interpret the information encoded in the additional digits of the UHF element 215. For example, the UHF element 215 may be used to register individual items into the inventory management system 140 (FIG. 1), including data unique to each item, such as chain of custody, unique serial number, item expiration date, a shape of the tag, e.g., rectangular or square, a product brand, and/or a customer identifier.

In some implementations, the dual frequency RFID tag 205 may be manufactured using a material and/or adhesive that is capable of withstanding various environments, such as a range of temperature settings. For example, the material and/or adhesive may be suitable for a cold-storage environment, e.g., suitable for sustained operation in below-freezing and/or frosty environments. In addition or alternatively, the material and/or adhesive may be suitable for a hot-storage environment, e.g., suitable for sustained operation in high temperature environments.

Figure 2B:
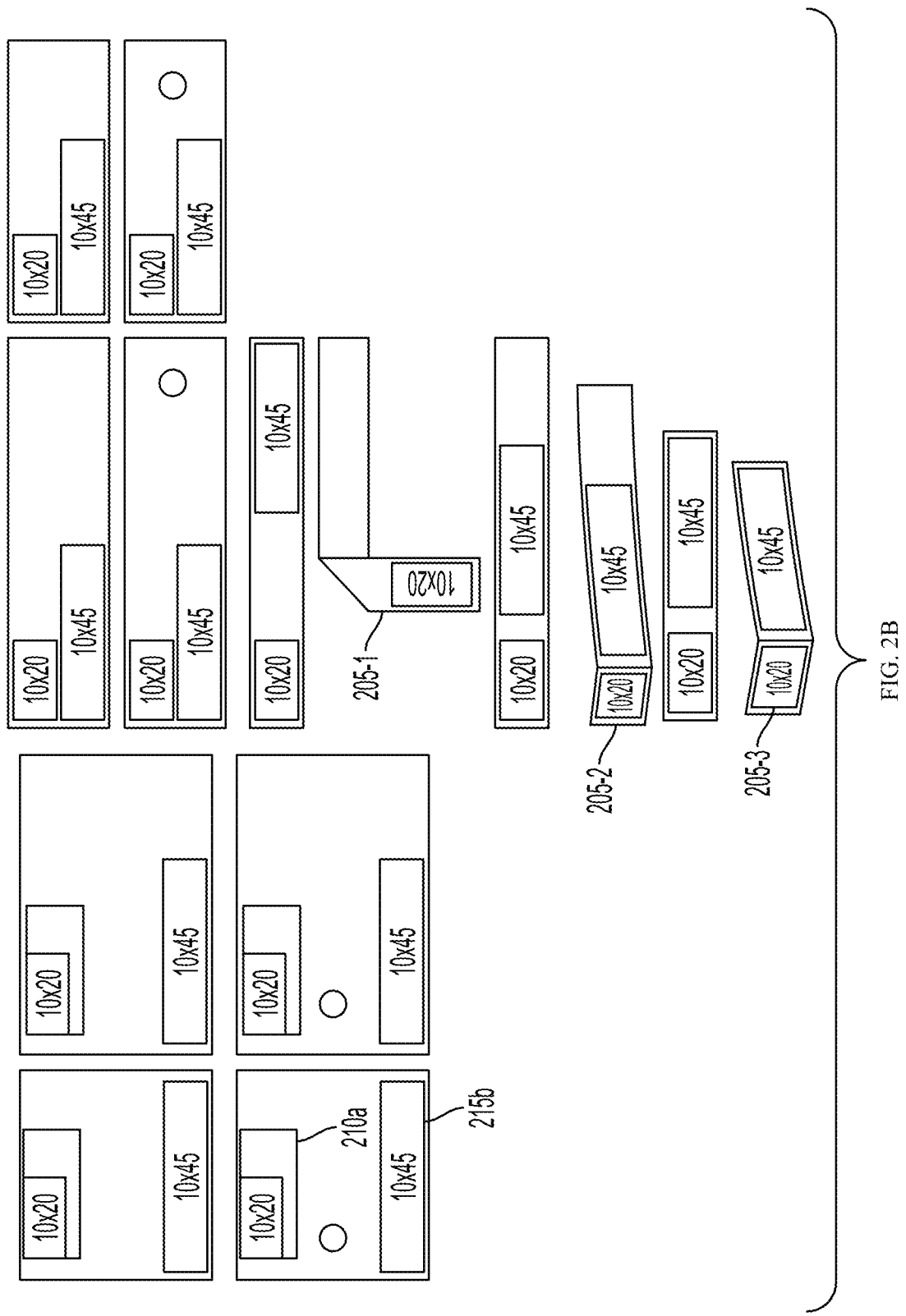
FIG. 2B illustrates various features of example dual frequency RFID tags for use in conjunction with aspects of the present disclosure.
Figure 10:
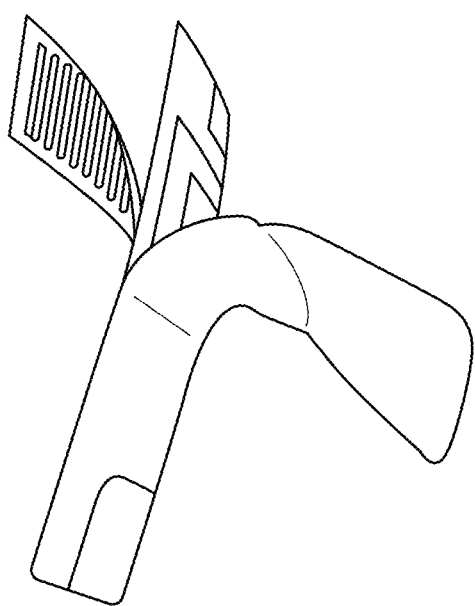
FIGS. 10-16 illustrate example RFID tags for use in conjunction with aspects of the present disclosure.
Figure 11:
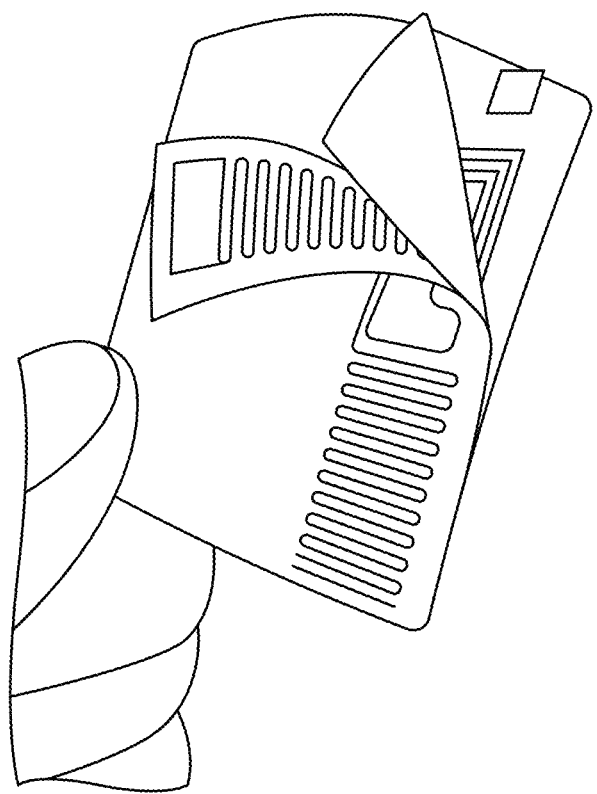
Figure 12:
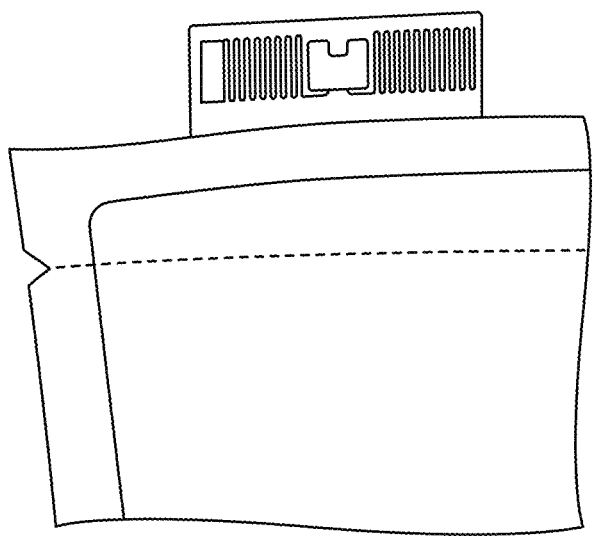
Figure 13:
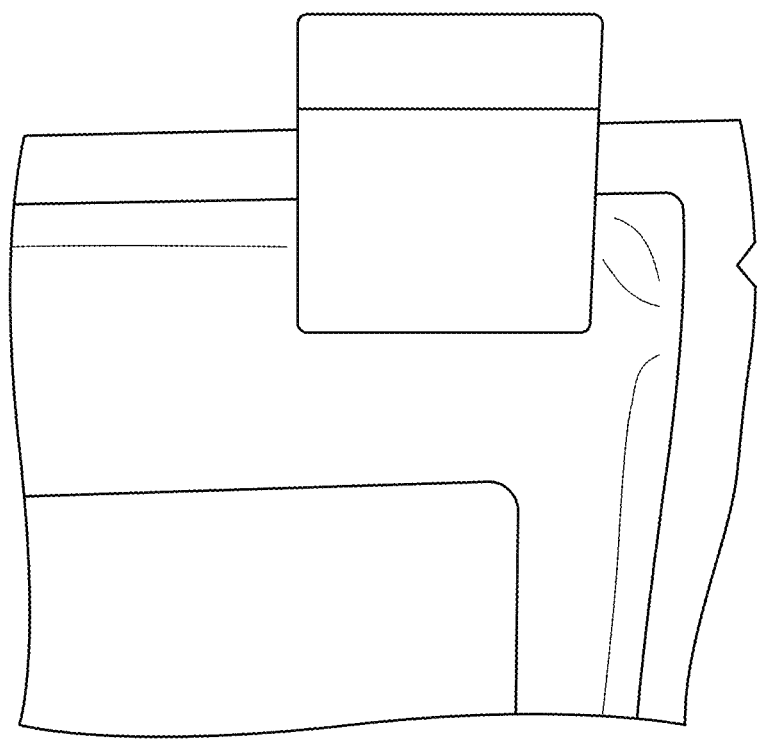

In further implementations, the dual frequency RFID tag 205 may be manufactured using various form factors, while still containing at least two of the LF element, the HF element 210 and the UHF element 215. For example, as illustrated in FIG. 2A, the HF element 210 may be located above the UHF element 215, as shown. Additionally, the dual frequency RFID tag 205 in FIG. 2A is shown as rectangular in shape. However, it should be understood by those of ordinary skill in the art that these shapes and orientations are merely examples of the HF element 210 and the UHF element 215, as well as those of the dual frequency RFID tag 205, and that other locations and/or shapes may be achieved based on the form factors of the dual frequency RFID tag 205, for example. In some implementations, the HF element 210 and UHF element 215 may be overlapped together into a flat tag, as shown in FIG. 10 and FIG. 11. For example, FIG. 2B illustrates a plurality of example dual frequency RFID tags 205, with the HF element 210$a$ and the UHF element 215$b$ of each dual frequency RFID tag being represented as a rectangle. In some implementations, the dual frequency RFID tag 205 may be a foldable tag. For example, the dual frequency RFID tag 205-1 may be folded 90 degrees, as shown in FIG. 2B, in order to wrap around an edge or corner of a package, as well as for use in other applications. As another example, the dual frequency RFID tags 205-2, 205-3 may be folded 180 degrees, such that the HF element 210 and the UHF element 215 may overlap, while also having a small offset. For example, this approach may allow the longer end to be affixed to a package with the shorter end extending like a flag, as shown in FIG. 12 and FIG. 13. In some implementations, the foldable dual frequency RFID tags 205-1, 205-2, 205-3 may improve/ensure readability of either, or both of, the HF element 210 and the UHF element 215, such as where either element may be obstructed from being read by the presence of, for example, conductive material on or in a package, or by an adjacent package. For example, some medical supplies may be packaged in foil pouches in order to preserve light-sensitivity or sterilization, and such foil packaging may obstruct or distort certain RFID tags or portions thereof. In another example, the RFID tag 205 may be shaped such that it may be used in a hanging storage system, for example, as described in U.S. patent application Ser. No. 12/258,847, filed on Oct. 27, 2008, and now issued as U.S. Pat. No. 8,174,392, the contents of which are hereby incorporated in their entirety. However, it should be understood by those of ordinary skill in the art that the elements described above may be any combination of the LF element, the HF element, and/or the UHF element.

Figure 14:
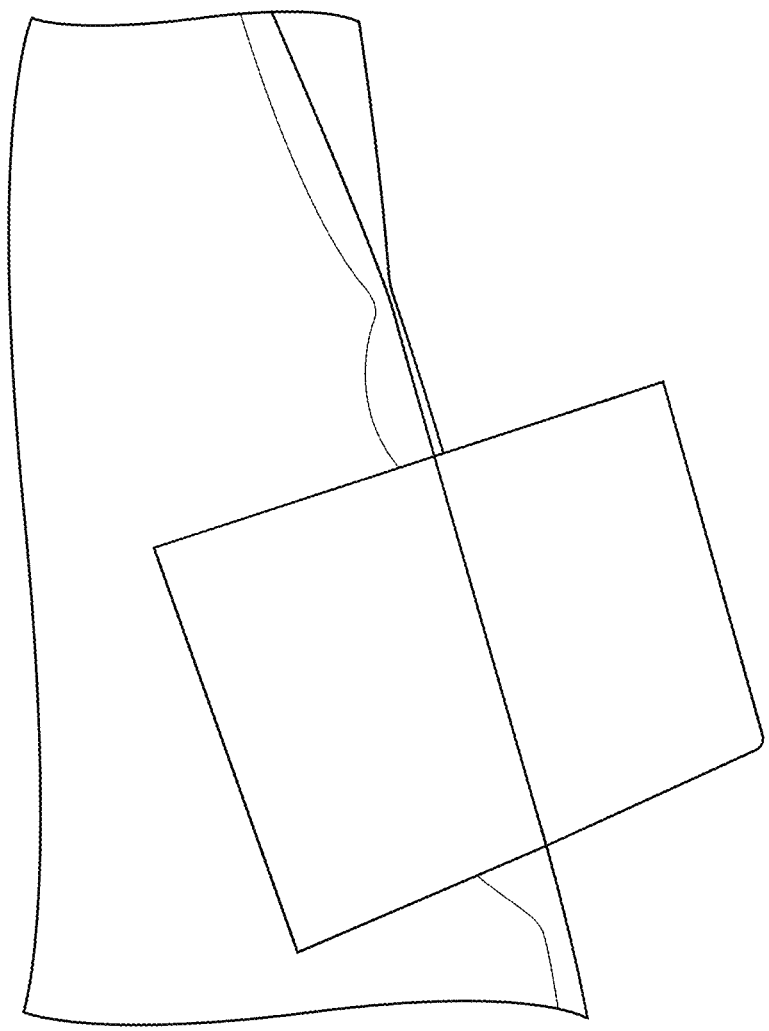
Figure 15:
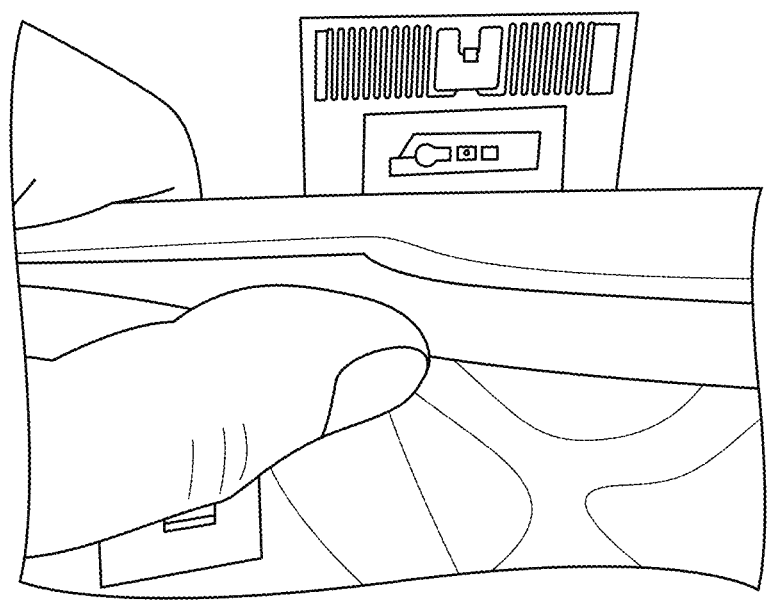
Figure 16:
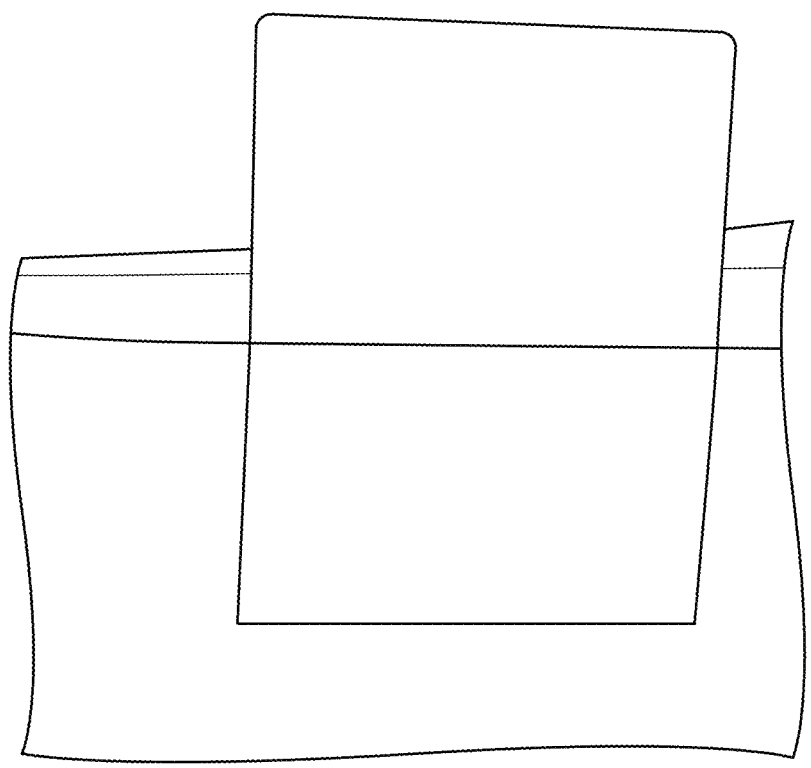

In some implementations, the dual frequency (or multi-frequency) RFID tag 205 may be manufactured onto an optically transparent material, in conjunction with a clear adhesive on its surface, in order to not visibly interfere with other apparent markings on the item, material, or packaging to which the tag may be attached. Additionally, the clear or optically transparent material may comprise any portion of the area or the entire area of the tag, in any suitable shape. FIGS. 14, 15, and 16 show an example combined implementation of an RFID tag having a clear surface comprising a portion of the tag with adhesive for affixing the tag, in conjunction with the HF and UHF elements protruding similarly to a flag.

In further implementations, the dual frequency RFID tag (e.g., tag 205 of FIG. 2A) may be manufactured using invisible printed markings, such as further to provide an invisible barcode or other optical reading feature, which may be visible only to machine barcode or other optical reading systems. In this way, for example, the dual frequency RFID tag 205 may be further read by such systems without visible interference with other markings on the device to which the tag 205 is attached. Additionally, in further implementations, the dual frequency RFID tag 205 may be manufactured using a transparent material, e.g., transparent conductive ink applied to a transparent carrier film.

In some implementations, one or more products may be tracked through the supply chain from the manufacturer to the distributor to the consumer. For instance, using the UHF element 215, the manufacturer system 110 (FIG. 1) may scan the one or more tagged products, such as when the one or more products move through a manufacturing facility to a loading area for shipment. In some implementations, upon scanning the tagged products using, for example, a gate scanner, the manufacturer system 110 (FIG. 1) may retrieve data information stored on the UHF element 215 and transmit such information to the inventory management system 140 (FIG. 1). In turn, the inventory management system 140 (FIG. 1) may store the information obtained from the UHF element 215 when the product is shipped by the manufacturer. Upon receipt of the tagged products from the manufacturer, the distributor or the consumer or other user may likewise scan the tagged products using a gate scanner, for example, and transmit the collected information to the inventory management system 140 (FIG. 1). For example, the gate scanner may allow for bulk scanning of the plurality of tagged products, thereby avoiding scanning of individual products, as should be understood by those of ordinary skill in the arts. Using this information, the inventory management system 140 (FIG. 1) may compare the information received from the manufacturer system 110 (FIG. 1) to the information received from the distributor system 120 (FIG. 1) or the consumer system 130 (FIG. 1), for example, to verify that the products match, e.g., to determine if there are any discrepancies between what was shipped by the manufacturer and what was received by the distributor or consumer. By scanning the UHF elements of the tagged products using, for example, a gate scanner, the manufacturer system 110 (FIG. 1), distributor system 120 (FIG. 1), and consumer system 130 (FIG. 1) may each quickly identify and gather information on the tagged products in bulk, rather than having to individually scan each of the tagged products, as would be required with an HF element based scanner configured to scan only a single RFID tag at a time, such as a near-field communication (NFC) reader of a mobile device.

In further implementations, the UHF element 215 of each product may be scanned to provide for cycle counting, such as while the product is stored in inventory at any one of the manufacturer, distributor, or consumer. For example, while in inventory, the UHF element 215 of each product may be scanned using a mobile RFID scanner or using an RFID-enabled enclosure, such as a storage shelf, cabinet, cold-storage space, etc. In some implementations, the RFID-enabled enclosure may be configured with RFID reader elements to read either, both of, or all of the HF element 210, the UHF element 215, and the LF element, either concurrently or alternatingly. Additionally, by being configured to scan all HF, UHF and LF elements, the RFID-enabled enclosure may be configured to allow scanning and storage of variously tagged products having only a single RFID protocol or three RFID protocols, e.g., LF, HF and UHF. Furthermore, the RFID-enabled enclosure configured to scan any of LF, HF and UHF elements may provide for scanning tagged products at any stages within the supply chain and product lifecycle, or for inventories of products for which materials are compatible with LF, HF or UHF elements. For example, as described above, the RFID tags provided by the purveyor of the inventory management system 140 may incorporate dual frequency RFID tags that are compatible with any user/customer systems. For example, the dual frequency RFID tag provided may contain RFID elements for UHF and LF, and thus the manufacturer that operates on UHF, the distributor who operates on LF, and the consumer or other user with RFID readers that operate on any of the three described bands, thereby may all communicate with the dual frequency RFID tag. Further, those of ordinary skill in the art will understand that various materials, such as metal or water, may affect performance of RFID systems and hence readability of LF, HF, and/or UHF elements. In some implementations, the RFID-enabled enclosure may be shielded to attenuate any or all LF signals/HF signals/UHF signals in order to direct scanning toward the LF tags, HF tags and/or UHF tags.

In one aspect of the disclosure, the product affixed with a dual frequency RFID tag may be in custody of the consumer or other user and stored within an RFID enabled cabinet reader that is equipped with all three frequency types of RFID readers, UHF, HF and LF. The dual frequency RFID tag affixed to the physical product may be equipped with a UHF RFID element and a HF RFID element, thereby having the capability to be read by an RFID enabled cabinet. The product may be scanned, as described above, at pre-set intervals, such as every 10 minutes, and the UID of either or both of the UHF and HF RFID elements may be transmitted in conjunction with characteristic data to at least one of systems 110, 120, 130 or 140, as described above. In this example, the product may be removed from the RFID enabled cabinet right after a scan, for example, to be used in a procedure in an operating room where a procedure lasts an hour. Further, because the dual frequency RFID tag is not scanned at the last known location, the RFID enabled cabinet or the systems may consider the product lost/used/unaccounted for during the next 6 scans by the RFID enabled cabinet (as the product is not scanned). In one aspect of the disclosure, at least one of the systems 110, 120, 130 or 140, may place this product on a "watch" list for a pre-determined amount of time before determining to send a request to find the product, consider the product lost, update inventory, etc. In one aspect of the disclosure, the product may be scanned with an UHF or HF RFID enabled reader in the operating room to update at least one of systems 110, 120, 130 or 140, via its/their respective database(s), indicating that the product is now being used or is in the process of being used during the procedure in the operating room. In another aspect of the disclosure, the product may be only scanned with a LF RFID enabled reader in the operating room because UHF frequencies may be harmful, such as for a patient having a pacemaker. Because in this example, the specific dual frequency RFID tag only contains UHF and HF RFID elements, the product may not be updated in the system to determine its specific location (e.g., operating room). As described above, if the product is on the "watch" list and the product is placed back in the RFID enabled cabinet if not used during the procedure in the operating room the product may be scanned and updated in the database at the next interval and then taken off the "watch" list at that point. In the event that the product is placed in a different RFID enabled cabinet if not used during the procedure, it may be scanned and updated in the database at the next interval and taken off the "watch" list at that point. Further, for example, the product may be scanned by either a tri-band RFID enabled reader at a specific location or a LF RFID enabled reader to update the location of the product and taken off the "watch" list in the event the product was used during the procedure and is being discarded or sent to refurbishment and scanned before exiting the facility. Finally, the product may never be scanned again and considered lost/used/unaccounted based on extended inclusion on the "watch" list.

In further implementations, after delivery of the tagged products to the consumer, the LF element and/or HF element 210 of each product may be scanned at close proximity, such as during unpacking of the products from a shipping container (e.g., a carton or a tote), while contemporaneously avoiding the scanning and/or identification of non-targeted products. Upon scanning each individual product, the consumer system 130 (FIG. 1) may transmit the information to the inventory management system 140 (FIG. 1). Additionally, while the products are stored by the consumer, the LF element, the HF element 210 or the UHF element 215 may be scanned by the consumer system 130 (FIG. 1), and such information may be transmitted to the inventory management system 140 (FIG. 1). In this way, the inventory management system 140 (FIG. 1) is able to monitor each of the products stored by the consumer to determine whether there are missing products, expired products, and/or products near expiration, for example. In some implementations, upon determining that a given product is missing from storage, the inventory management system 140 (FIG. 1) may monitor the consumer system 130 (FIG. 1) to determine whether the undetected product has been used by a technician, medical professional, etc. For example, the HF element 210 may be scanned to provide for a final disposition of individual products at a point-of-sale, a point-of-use, a trash receptacle, entrance/exit of a location, or any other instance when the individual product is removed from inventory, and the consumer system 130 (FIG. 1) may report such final disposition to the inventory management system 140 (FIG. 1), for example, as described in U.S. patent application Ser. No. 11/765,950, filed on Jun. 20, 2007, and now issued as U.S. Pat. No. 8,281,994, as described in U.S. patent application Ser. No. 11/383,422, filed on May 15, 2006, and now issued as U.S. Pat. No. 7,639,136, and as described in U.S. patent application Ser. No. 12/616,630, filed on Nov. 11, 2009, and now issued as U.S. Pat. No. 7,990,272, the contents of each being hereby incorporated by reference in their entirety. As result, the inventory management system 140 (FIG. 1) may determine whether the undetected product has been used or is missing from the overall inventory. Additionally, the inventory management system 140 (FIG. 1) may use this information to, for example, predict inventory needs based on use history and maintenance age and other data for inventory items (e.g., to identify expired or out of date items).

In one aspect of the disclosure, a non-handheld RFID reader may strip any additional data blocks obtained when reading the RFID element, as described above with regards to standards, and provide only the UID to the respective systems, 110, 120, 130, and/or 140. In another aspect of the disclosure, a handheld RFID reader may not strip any additional data blocks obtained when reading the RFID element, as described above with regards to RFID standards, and provide the entire contents to the respective systems, 110, 120, 130, and/or 140. The respective systems, 110, 120, 130 and/or 140 may remove the additional data blocks prior to storing/updating the database and/or use the additional data blocks to store/update the database.

As one example of use, an example system in accordance with aspects of present disclosure may be used to track a medical supply product from point of manufacture through to final disposition at the consumer, e.g., a point-of-use in a patient procedure or other final disposition. By tracking the medical supply product throughout its lifecycle, the inventory management system 140 (FIG. 1) may be used to ensure authentication/anti-counterfeiting of medical products, compliance with handling requirements of the medical products, such as chain of custody, temperature, moisture, shock or vibration, etc., allocation of correct item to correct patient, and billing accuracy of item(s) consumed in medical procedures. To track the medical supply product through its lifecycle, the medical supply product may be packaged and tagged with the dual frequency RFID tag 205 (FIG. 2A), and the manufacturer system 110 (FIG. 1) may scan the UHF element 215 (FIG. 2A) while the tagged products are transported across a manufacturing floor to loading/shipment area, including placement in a carton, a pallet, or a container, and after departure from the manufacturer, for example. In turn, the manufacturer system 110 (FIG. 1) may report the information related to the tagged and scanned products to the inventory management system 140 (FIG. 1). In some implementations, the UHF element 215 (FIG. 2A) may be scanned while the tagged products are in transit to, for example, the distributor or the consumer, and this information may be transmitted to the inventory management system 140 (FIG. 1). Additionally, after receipt at either the distributor or the consumer, the UHF element 215 (FIG. 2A) of the tagged products may be scanned during an unloading period, and the information may again be transmitted to the inventory management system 140 (FIG. 1) via either the distributor system 120 (FIG. 1) or the consumer system 130 (FIG. 1), for example. Using this information, the inventory management system 140 (FIG. 1) may analyze the data to determine if there are any discrepancies between the products shipped by the manufacturer and the products received by the distributor or the consumer. In some implementations, the tagged products may be temporarily stored or repackaged at the distributor system, and during such time, the UHF element 215 (FIG. 2A), the LF element, and/or the HF element 210 (FIG. 2A) may be scanned and reported to the inventory management system 140 (FIG. 1), such that the inventory management system 140 (FIG. 1) may continue to track the products throughout the supply chain.

In further implementations, when the tagged products are shipped from the distributor, for example, the tagged products may again be scanned in a similar manner as shipment from the manufacturer. When the tagged products are delivered to the consumer, the UHF element 215 (FIG. 2A) of the tagged products may be scanned during unloading, and the information may again be transmitted to the inventory management system 140 (FIG. 1) via the consumer system 130 (FIG. 1). Using this information, the inventory management system 140 (FIG. 1) may analyze the data to determine if there are any discrepancies between the products shipped by the distributor and the products received by the consumer.

Additionally, the tagged products may be stored, for example, in a storage room, an RFID-enabled storage shelf, cabinet, or cold-storage space, etc., until needed. Additionally, while the products are stored by the consumer, the LF element, the HF element 210 (FIG. 2A) and/or the UHF element 215 (FIG. 2A) may be scanned by the consumer system 130 (FIG. 1), and such information may be transmitted to the inventory management system 140 (FIG. 1). In this way, the inventory management system 140 (FIG. 1) may able to monitor each of the products stored by the consumer to determine whether there are missing products, expired products, and/or products near expiration, for example. In some implementations, upon determining that a given product is missing from storage, the inventory management system 140 (FIG. 1) may monitor the consumer system 130 (FIG. 1) to determine whether the undetected product has been used by a technician, medical professional, etc. For example, the HF element 210 (FIG. 2A) may be scanned to provide for a final disposition of individual products, such as when the tagged products are placed into a kit or cart for use in, for example, an operating room procedure, assigned to a patient, and then consumed, returned to stock, sent to another location, e.g., sent to another consumer, disposed in trash, sent for refurbishment, or returned to manufacturer system 110 (FIG. 1), if unused. The consumer system 130 (FIG. 1) may report such final disposition to the inventory management system 140 (FIG. 1), which may then determine whether the undetected product has been used or is missing from the overall inventory. Additionally, the inventory management system 140 (FIG. 1) may use this information to, for example, predict inventory needs based on use history and maintain age and other data for inventory items (e.g., to identify expired or out of date items).

As another example, the inventory management system 140 (FIG. 1) may be used to track a cold-chain product, such as a human skin graft. For example, the cold-chain product may be harvested, packaged, and tagged with a dual frequency RFID tag 205 (FIG. 2A). Much like the medical supply product, the cold-chain product may tracked during shipment using the UHF element 215 (FIG. 2A), and registered by the inventory management system 140 (FIG. 1) using the LF element, the HF element 210 (FIG. 2A) and/or the UHF element 215 (FIG. 2A). Once registered, the cold-chain product may then be stored in an UHF RFID enabled freezer, a HF RFID enabled freezer, or a HF/UHF RFID enabled freezer. In this way, the cold-chain product may be tracked with the LF element prior to being placed into a freezer, and the HF element 210 (FIG. 2A) or the UHF element 215 (FIG. 2A) may be used while being stored. Namely, the LF element, the HF element 210 (FIG. 2A) or the UHF element 215 (FIG. 2A) of the cold-chain product may be scanned by the consumer system 130 (FIG. 1), and such information may be transmitted to the inventory management system 140 (FIG. 1). When the cold-chain product is required for use, such as a surgical transplant, and removed from the freezer, a LF, HF and/or UHF reader may be used to scan the cold-chain product, and this may be reported to the inventory management system 140 (FIG. 1). Thus, the consumer system 130 (FIG. 1) may report to the inventory management system 140 (FIG. 1) that the cold-chain product has been removed from inventory and assigned to a scheduled procedure. Furthermore, while the cold-chain product is being delivered to point of final disposition, e.g., an operating room, the UHF element 215 (FIG. 2A) of the cold-chain product may scanned using one or more UHF readers in corridors of the facility of the consumer system 130 (FIG. 1), such that the inventory management system 140 (FIG. 1) may monitor the chain of custody of the cold-chain product. Upon to the point of final disposition, the LF element and/or the HF element 210 (FIG. 2A) of the cold-chain product may be scanned, and the consumer system 130 (FIG. 1) may report to the inventory management system 140 (FIG. 1) that the cold-chain product has been finally disposed.

Figure 4:
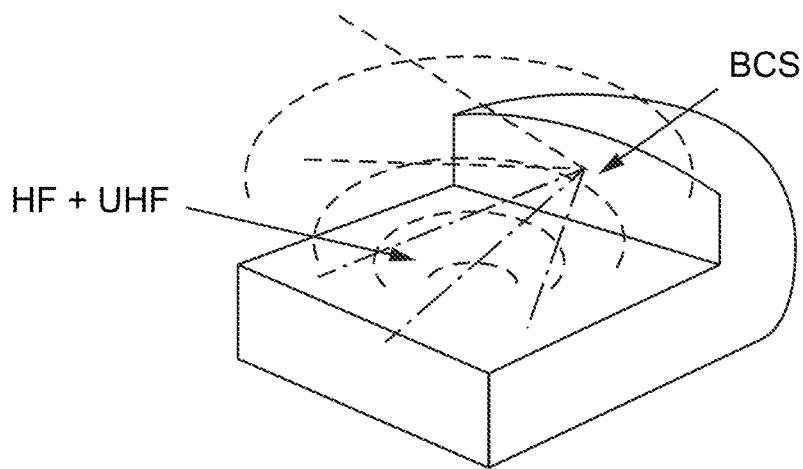
FIGS. 4-9 illustrate example stand-alone reader devices for use in conjunction with aspects of the present disclosure.
Figure 5:
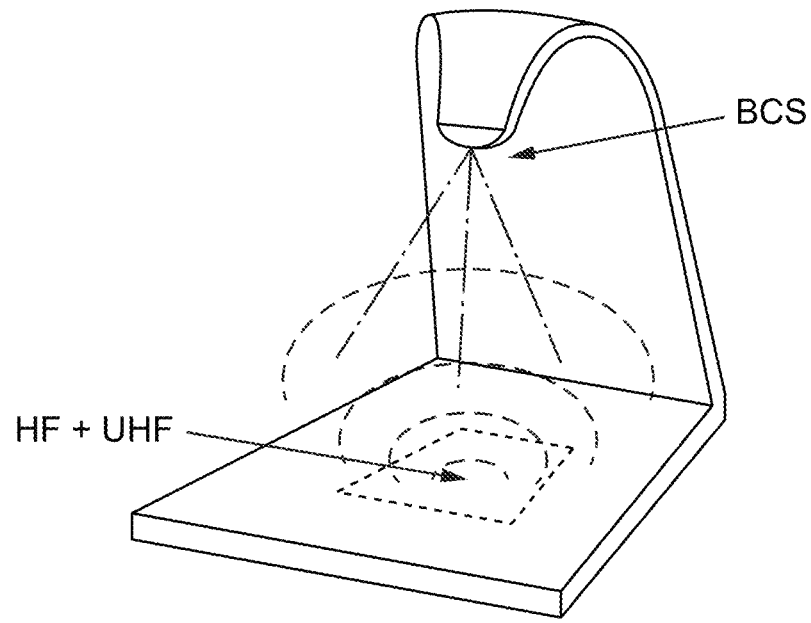
Figure 6:
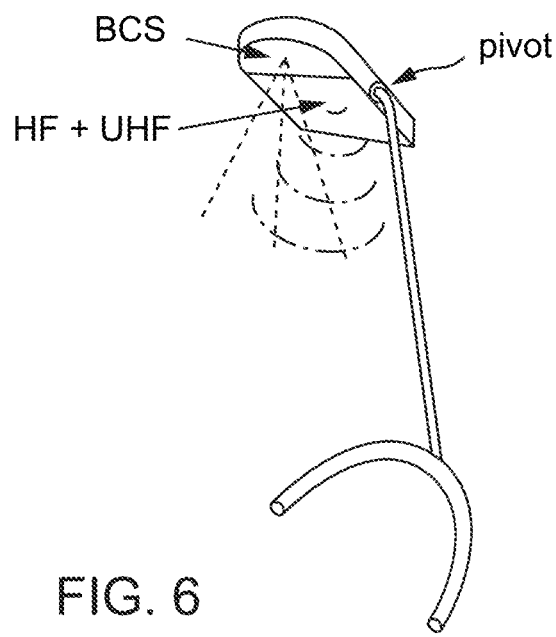

Aspects of the present disclosure are also directed to a stand-alone reader device that may include a LF reader element, a HF reader element, a UHF reader element, and a barcode scanner (BCS) or other optical reader element (such scanners and readers interchangeably referred to herein as "BCS element"), as illustrated in FIGS. 4-9. In some implementations, the stand-alone reader may send information collected when scanning the dual frequency RFID tag, or any other RFID tag or barcode/other optical element, to the inventory management system 140. In some implementations, as shown in FIGS. 4-9, the stand-alone reader may be configured such that the LF, HF, UHF, and BCS reading elements may be positioned for reading one or more RFID tag(s) and/or one or more barcodes/optical elements on an item. For example, the stand-alone reader device may include a single actuator that may scan any or all of the LF RFID tags, HF RFID tags and UHF RFID tags. In this way, the stand-alone reader device may read any RFID-tagged product regardless of point of entry into the system and without regard to the type of RFID tag applied to the product, i.e., whether the RFID ID tag is a LF tag, HF tag, UHF tag, the dual frequency tag, or a combination of all three frequencies, as described herein. In some implementations, as shown in FIGS. 4-6, the stand-alone reader may be or comprise a mobile device, such as a hand-held scanner or an integrated tablet, or a stationary device. In some implementations, when the stand-alone device is a stationary device, the stand-alone device may also include a detachable element that is capable of being removed from a stationary base.

In one example, the stand-alone reader may be configured as a hand-held device having an LF/HF/UHF scanning element on a first surface and a BCS element on a second surface, as illustrated in FIG. 4. As another example, the stand-alone reader may be or include a stationary device having a LF/HF/UHF scanning element on one surface (e.g., a bottom surface as shown in FIG. 5), which may scan RFID tags located about the LF/HF/UHF scanning element and a BCS element, which may scan barcodes/optical elements readable by the BCS element, such as when located below the BCS reader element as illustrated in FIG. 5.

In a further example, the stand-alone device may be or include a mobile device with an optional stand for mounting the mobile stand-alone reader, as illustrated in FIG. 6. Additionally, as illustrated in FIG. 6, the stand-alone reader may pivot along an axis while mounted to stand.

Figure 7:
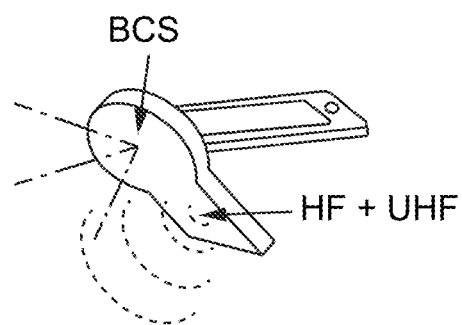
Figure 8:
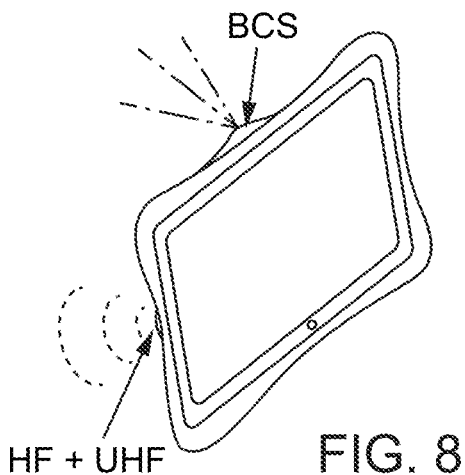

In further examples, the stand-alone reader may be or include a portable device, such as a mobile telephone, as shown in FIG. 7, or an integrated tablet, as shown in FIG. 8.

Figure 9:
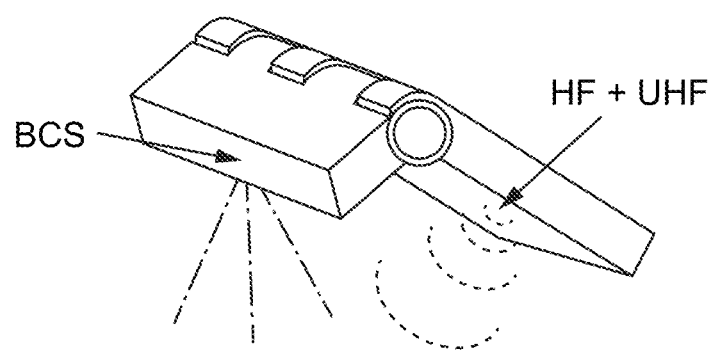

In another example, the stand-alone reader may be configured as a hand-held device having a LF/HF/UHF scanning element on a first surface and a BCS element on a second surface hingedly attached the first surface, as illustrated in FIG. 9. Thus, as shown in FIGS. 4-9, the stand-alone reader may be configured in various manners, such that the LF, HF, UHF, and BCS reading elements may be positioned for reading one or more RFID tag(s) and/or one or more barcodes/optical elements on an item.

In further implementations, the inventory management system 140 (FIG. 1) may store operating parameters for the stand-alone reader device specific to the location at which the stand-alone reader device currently being used. For example, as the stand-alone reader device is transported from one location to another, the inventory management system 140 (FIG. 1) may track a location of the stand-alone reader device using a tracking element, such a global positioning system (GPS) device, and transmit a control signal to the stand-alone reader device based on such location so as to adjust the operating parameters of the stand-alone reader device accordingly. In some implementations, the operating parameters may include setting the transmit power level of the RFID signals transmitted by the stand-alone reader device and/or the receive power level of the signals from the RFID tags received by the stand-alone reader device. For example, in a storage facility, e.g., a large inventory space, such as a warehouse or the like, the stand-alone reader device may require a high power level sufficient is to scan over further distances, whereas when the same stand-alone reader device is used at a personal workstation to read individually tagged products, i.e., scanning one product at a time, the stand-alone reader device may require a low power level in order to not read other tags that may be in the vicinity of the workstation but not at the workstation.

Other operating parameters may include whether the stand-alone reader device generates a notification, such as a visual, audible, or tactile notification, when the stand-alone reader device successfully scans an RFID tag or a barcode/optical element. In further implementations, the stand-alone reader device may be configured to generate the notification based on a location of the stand-alone reader device, such as a visual, audible, or tactile notification. For example, the stand-alone reader device may be configured to generate a visual and/or a tactile notification when being used in a location where an audible notification may cause a distraction or may interfere with audible notifications generated by another medical device (e.g., a heart monitor), such as when used in an operating room or in a patient room. As another example, the stand-alone reader device may be configured to generate any suitable type notification when being used in, for example, the storage facility. In this way, if the stand-alone reader device is removed from a given location, the inventory management system 140 (FIG. 1) may adjust the operating parameters of the stand-alone reader device accordingly.

FIG. 17A illustrates one example implementation of a method for managing inventory through the supply chain and lifecycle of a product. The method may include receiving first information associated with a plurality of products from a manufacturer 1010. The first information may be obtained by scanning an ultra-high frequency (UHF) radio frequency identification (RFID) tag applied to each of the plurality of products. The method may also include receiving second information associated with the plurality of products upon delivery of the plurality of products to a distributor of the plurality of products 1020. The second information may be obtained by scanning the UHF RFID tag applied to each of the plurality of products. The method may further include receiving third information associated with the plurality of products upon delivery of the plurality of products to a consumer of the plurality of products 1030. The third information may be obtained by scanning the UHF RFID tag applied to each of the plurality of products. The method may also include receiving fourth information associated with respective ones of the plurality of products 1040. The fourth information associated with the respective ones of the plurality of products may be obtained by scanning a LF RFID tag and/or a HF RFID tag applied to each of the plurality of products. The method may also include monitoring a state of at least one of the plurality of products based on the respective fourth information until a final disposition of the at least one of the plurality of products 1050.

Figure 17B:
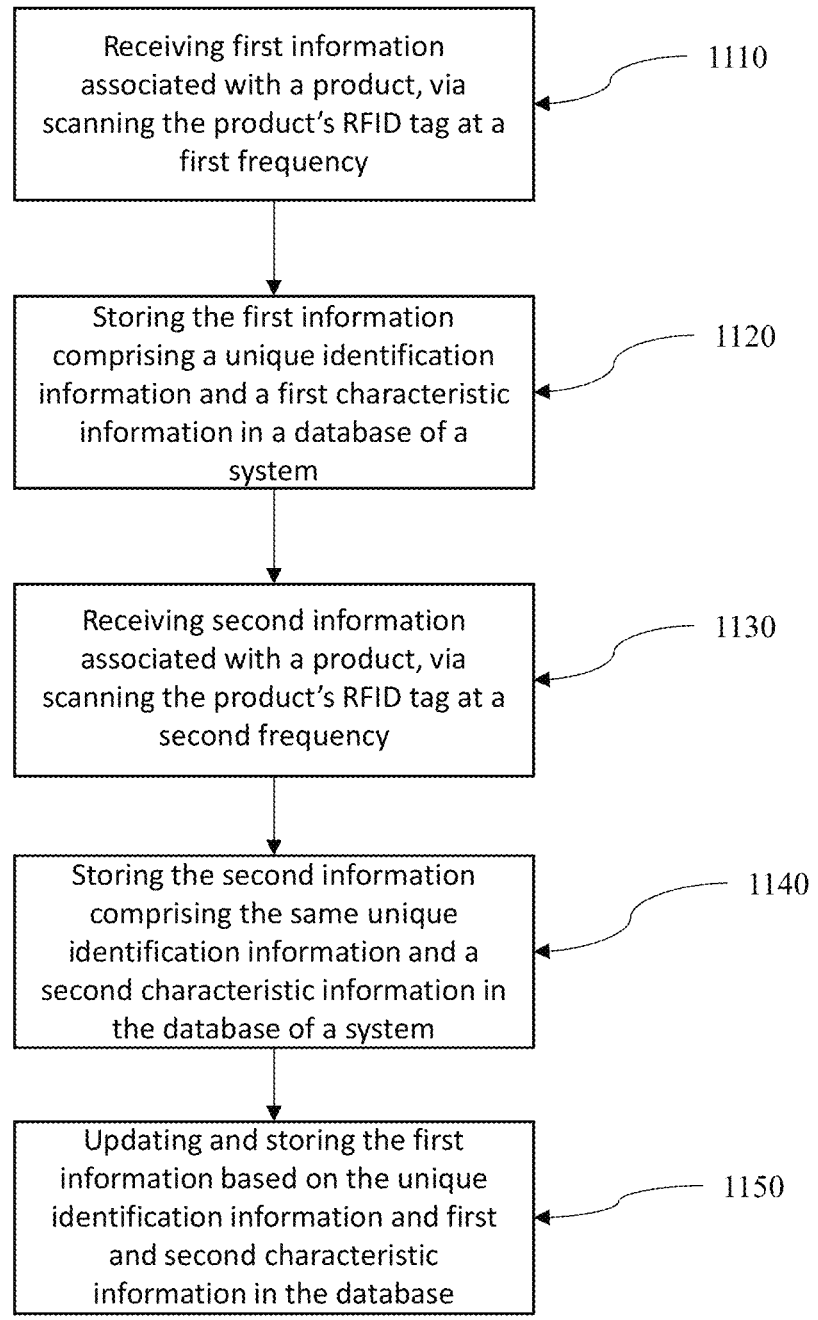
FIG. 17B illustrates a flowchart for another example implementation for managing inventory through the supply chain and lifecycle of a product in accordance with aspects of the present disclosure.

FIG. 17B illustrates another example implementation of a method for managing inventory through the supply chain and lifecycle of a product. The method may include at step 1110 receiving first information associated with a product. The first information may be obtained by scanning the first RFID element with a UHF radio frequency identification in the RFID tag applied to a product. The product comprising the RFID tag may also be scanned with a HF or LF radio frequency. The method may further include at step 1120 storing the first information comprising a unique identification information and a first characteristic information in a database of a system. The method may also include at step 1130 receiving second information associated with the same product. The second information may be obtained by scanning the UHF, HF or LF RFID element in the RFID tag applied to the product, where the second information is obtained by scanning a second RFID element in the RFID tag at a different frequency from scanning the first RFID element in the RFID tag. The method may further include at step 1140 storing the second information comprising the unique identification information and a second characteristic information in a database of a system. The method may further include at step 1150 updating and storing the first information based on the unique identification information and first and second characteristic information in the database.

Figure 18:
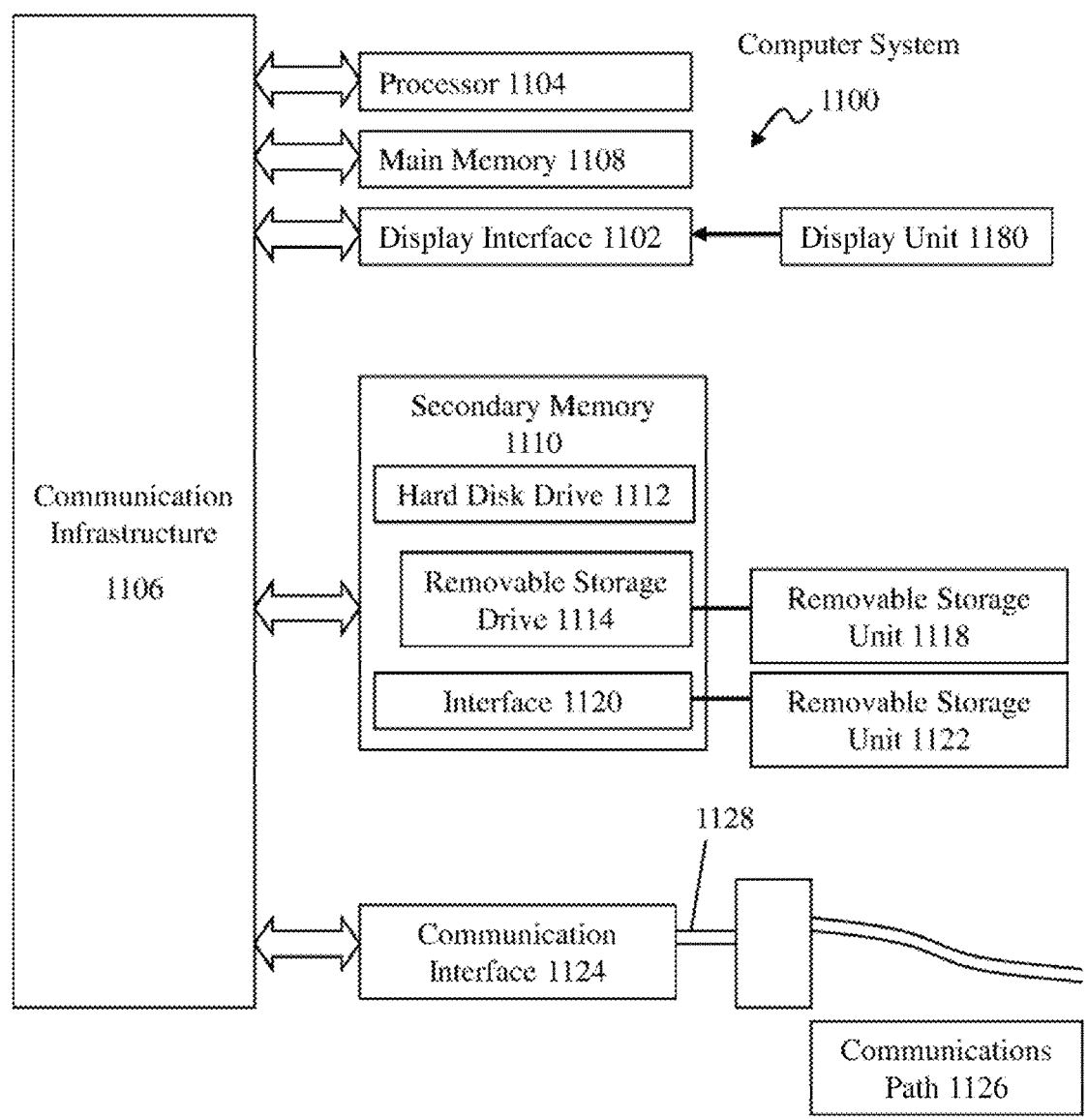
FIG. 18 illustrates various features of an example computer system for use in conjunction with aspects of the present disclosure.

Aspects of the present disclosure may be implemented using hardware, software, or a combination thereof and may be implemented in one or more computer systems or other processing systems. In an aspect of the present disclosure, features are directed toward one or more computer systems capable of carrying out the functionality described herein. An example of such a computer system 1100 is shown in FIG. 18.

Computer system 1100 includes one or more processors, such as processor 1104. The processor 1104 is connected to a communication infrastructure 1106 (e.g., a communications bus, cross-over bar, or network). Various software implementations are described in terms of this example computer system. After reading this description, it will become apparent to a person skilled in the relevant art(s) how to implement implementations of the disclosure using other computer systems and/or architectures.

Computer system 1100 may include a display interface 1102 that forwards graphics, text, and other data from the communication infrastructure 1106 (or from a frame buffer not shown) for display on a display unit 1180. Computer system 1100 also includes a main memory 1108, preferably random access memory (RAM), and may also include a secondary memory 1110. The secondary memory 1110 may include, for example, a hard disk drive 1112, and/or a removable storage drive 1114, representing a floppy disk drive, a magnetic tape drive, an optical disk drive, a universal serial bus (USB) flash drive, etc. The removable storage drive 1114 reads from and/or writes to a removable storage unit 1118 in a well-known manner. Removable storage unit 1118 represents a floppy disk, magnetic tape, optical disk, USB flash drive etc., which is read by and written to removable storage drive 1114. As will be appreciated, the removable storage unit 1118 includes a computer usable storage medium having stored therein computer software and/or data.

Alternative implementations of the present disclosure may include secondary memory 1110 and may include other similar devices for allowing computer programs or other instructions to be loaded into computer system 1100. Such devices may include, for example, a removable storage unit 1122 and an interface 1120. Examples of such may include a program cartridge and cartridge interface (such as that found in video game devices), a removable memory chip (such as an erasable programmable read only memory (EPROM), or programmable read only memory (PROM)) and associated socket, and other removable storage units 1122 and interfaces 1120, which allow software and data to be transferred from the removable storage unit 1122 to computer system 1100.

Computer system 1100 may also include a communications interface 1124. Communications interface 1124 allows software and data to be transferred between computer system 1100 and external devices. Examples of communications interface 1124 may include a modem, a network interface (such as an Ethernet card), a communications port, a Personal Computer Memory Card International Association (PCMCIA) slot and card, etc. Software and data transferred via communications interface 1124 are in the form of signals 1128, which may be electronic, electromagnetic, optical or other signals capable of being received by communications interface 1124. These signals 1128 are provided to communications interface 1124 via a communications path (e.g., channel) 1126. This path 1126 carries signals 1128 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 1118, a hard disk installed in hard disk drive 1112, and signals 1128. These computer program products provide software to the computer system 1100. Implementations of the present disclosure are directed to such computer program products.

Computer programs (also referred to as computer control logic) are stored in main memory 1108 and/or secondary memory 1110. Computer programs may also be received via communications interface 1124. Such computer programs, when executed, enable the computer system 1100 to perform the features in accordance with implementations of the present disclosure, as discussed herein. In particular, the computer programs, when executed, enable the processor 1104 to perform the features in accordance with implementations of the present disclosure. Accordingly, such computer programs represent controllers of the computer system 1100.

In an aspect of the present disclosure where the disclosure is implemented using software, the software may be stored in a computer program product and loaded into computer system 1100 using removable storage drive 1114, hard drive 1112, or communications interface 1120. The control logic (software), when executed by the processor 1104, causes the processor 1104 to perform the functions described herein. In another aspect of the present disclosure, the system is implemented primarily in hardware using, for example, hardware components, such as application specific integrated circuits (ASICs). Implementation of the hardware state machine so as to perform the functions described herein will be apparent to persons skilled in the relevant art(s).

Figure 19:
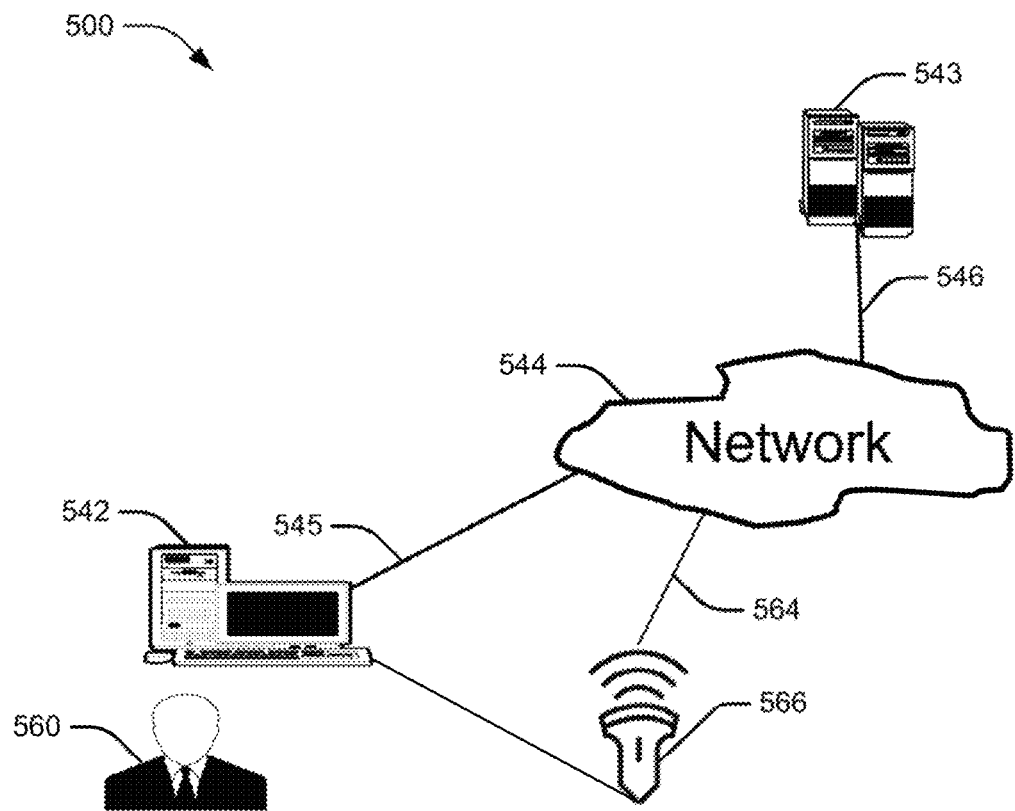
FIG. 19 illustrates a block diagram of various example system components, in accordance with aspects of the present disclosure.

FIG. 19 is a block diagram of various example system components, in accordance with aspects of the present disclosure. FIG. 19 shows a communication system 500 including one or more accessors 560 (also referred to interchangeably herein as one or more "users"), one or more terminals 542 and one or more peripheral input devices 566. Terminal 542 and peripheral input device 566 can include systems 110, 120, 130 and 140, described above, or a related system, and/or the like. In one aspect, data for use in accordance with aspects described herein may be input and/or accessed by accessors 560 via terminal 542, or peripheral input device 566, such as personal computers (PCs), minicomputers, mainframe computers, microcomputers, telephonic devices, or wired/wireless devices, such as personal digital assistants ("PDAs") and RFID readers (e.g., handheld, mobile, cabinets, etc.) coupled to a server 543, such as a PC, minicomputer, mainframe computer, microcomputer, or other device having a processor and a repository for data and/or connection to a repository for data, via, a network 544 for instance, such as the Internet or an intranet, and couplings 545, 546, 564. The terminal 542 and/or peripheral input device 566 may be used to "register," add or scan the dual frequency RFID tag to the systems, described above. Further, the terminal 542 peripheral input device 566 may be implemented to monitor, remove, add, scan, etc. the dual frequency RFID tags of the system described above. The couplings 545, 546, 564 may include wired, wireless, or fiberoptic links. In another example variation, the method and system in accordance with aspects described herein operate in a stand-alone environment, such as on a single terminal.

The aspects discussed herein can also be described and implemented in the context of computer-readable storage medium storing computer-executable instructions. Computer-readable storage media includes computer storage media and communication media, and may be, flash memory drives, digital versatile discs (DVDs), compact discs (CDs), floppy disks, and tape cassettes. Computer-readable storage media can include volatile and nonvolatile, removable and non-removable media implemented in any method or technology for storage of information such as computer readable instructions, data structures, modules or other data.

While the aspects described herein have been described in conjunction with the example aspects outlined above, various alternatives, modifications, variations, improvements, and/or substantial equivalents, whether known or that are or may be presently unforeseen, may become apparent to those having at least ordinary skill in the art. Accordingly, the example aspects, as set forth above, are intended to be illustrative, not limiting. Various changes may be made without departing from the spirit and scope of the disclosure. Therefore, the disclosure is intended to embrace all known or later-developed alternatives, modifications, variations, improvements, and/or substantial equivalents.

Thus, the claims are not intended to be limited to the aspects shown herein, but are to be accorded the full scope consistent with the language of the claims, wherein reference to an element in the singular is not intended to mean "one and only one" unless specifically so stated, but rather "one or more." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

It is understood that the specific order or hierarchy of the processes/flowcharts disclosed is an illustration of example approaches. Based upon design preferences, it is understood that the specific order or hierarchy in the processes/flowcharts may be rearranged. Further, some features/steps may be combined or omitted. The accompanying method claims present elements of the various features/steps in a sample order, and are not meant to be limited to the specific order or hierarchy presented.

Further, the word "example" is used herein to mean "serving as an example, instance, or illustration." Any aspect described herein as "example" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. Nothing disclosed herein is intended to be dedicated to the public regardless of whether such disclosure is explicitly recited in the claims.

What is claimed is:

1. A system, comprising:
   a memory; and
   a processor coupled to the memory and configured to execute instructions, wherein the instructions cause the processor to:
   receive first identification information from a dual-frequency radio frequency identification (RFID) tag affixed to a product at a first frequency at a first location;
   register a status of the product based on the first identification information in the memory which includes an indication with regard to whether the product is a temperature sensitive product;
   receive second identification information from the dual-frequency RFID tag affixed to the product at a second frequency at a second location; and
   update the status in the memory based on the second identification information,
   wherein the first location is outside a freezer and the second location is inside the freezer.

2. The system of claim 1, wherein the first frequency is a low frequency (LF) or a high frequency (HF).

3. The system of claim 2, wherein the second frequency is an ultra-high frequency (UHF) or a high frequency (HF).

4. The system of claim 1, wherein the second identification information is received from the freezer that includes a UHF or HF RFID enabled reader.

5. The system of claim 1, wherein the second identification information is received from a handheld UHF or HF RFID enabled reader.

6. The system of claim 1, wherein the first identification information and the second identification information include same information.

7. The system of claim 1, wherein the dual-frequency RFID tag is capable of sustained operation in below-freezing or frosty environments.

8. The system of claim 1, wherein the dual-frequency RFID tag is affixed to the product via an adhesive that is capable of withstanding a cold-storage environment.

9. The system of claim 1, wherein the dual-frequency RFID tag is configured to track cold-chain integrity of the product.

10. The system of claim 1, wherein the instructions cause the processor to further receive third identification information from the dual-frequency RFID tag affixed to the product at the first frequency, the second frequency or a third frequency at a third location, and wherein updating the status in the memory based on the third identification information includes updating a patient procedure or final disposition.

11. The system of claim 1, wherein updating the status in the memory based on the second identification information includes assigning the product to a scheduled medical procedure.

12. The system of claim 11, wherein the instructions cause the processor to further receive third identification information from the dual-frequency RFID tag affixed to the product at the first frequency, the second frequency or a third frequency at a third location.

13. The system of claim 12, wherein the first identification information, the second identification information and the third identification information include same information.

14. The system of claim 12, wherein the third identification information indicates the temperature sensitive product is finally disposed.

15. A system, comprising:
a memory; and
a processor coupled to the memory and configured to execute instructions, wherein the instructions cause the processor to:
receive first identification information from a dual-frequency radio frequency identification (RFID) tag affixed to a product at a first frequency at a first location;
register a status of the product based on the first identification information in the memory which includes an indication with regard to whether the product is a temperature sensitive product;
receive second identification information from the dual-frequency RFID tag affixed to the product at a second frequency at a second location; and
update the status in the memory based on the second identification information,
wherein updating the status in the memory based on the second identification information includes assigning the product to a scheduled medical procedure.

16. The system of claim 15, wherein the instructions cause the processor to further receive third identification information from the dual-frequency RFID tag affixed to the product at the first frequency, the second frequency or a third frequency at a third location.

17. The system of claim 16, wherein the first identification information, the second identification information and the third identification information include same information.

18. The system of claim 16, wherein the third identification information indicates the temperature sensitive product is finally disposed.

19. The system of claim 16, wherein the first location, the second location or the third location is a physical location of the product.

20. The system of claim 15, wherein the first frequency is a low frequency (LF) or a high frequency (HF).

21. The system of claim 20, wherein the second frequency is an ultra-high frequency (UHF) or a high frequency (HF).

22. The system of claim 15, wherein the first location is outside a freezer and the second location is inside the freezer.

23. The system of claim 22, wherein the second identification information is received from the freezer that includes a UHF or HF RFID enabled reader.

24. The system of claim 15, wherein the second identification information is received from a handheld UHF or HF RFID enabled reader.

25. The system of claim 15, wherein the first identification information and the second identification information include same information.

26. The system of claim 15, wherein the dual-frequency RFID tag is capable of sustained operation in below-freezing or frosty environments.

27. The system of claim 26, wherein the dual-frequency RFID tag is affixed to the product via an adhesive that is capable of withstanding a cold-storage environment.

28. The system of claim 15, wherein the dual-frequency RFID tag is configured to track cold-chain integrity of the product.

29. A system, comprising:
a memory; and
a processor coupled to the memory and configured to execute instructions, wherein the instructions cause the processor to:
receive first identification information from a dual-frequency radio frequency identification (RFID) tag affixed to a product at a first frequency at a first location;
register a status of the product based on the first identification information in the memory which includes an indication with regard to whether the product is a temperature sensitive product;
receive second identification information from the dual-frequency RFID tag affixed to the product at a second frequency at a second location; and
update the status in the memory based on the second identification information,
wherein the instructions cause the processor to further receive third identification information from the dual-frequency RFID tag affixed to the product at the first frequency, the second frequency or a third frequency at a third location, and wherein updating the status in the memory based on the third identification information includes updating a patient procedure or final disposition.

30. A method, comprising:
receiving first identification information from a dual-frequency radio frequency identification (RFID) tag affixed to a product at a first frequency at a first location;
registering a status of the product based on the first identification information in a memory which includes an indication the product is a temperature sensitive product;
receiving second identification information from the dual-frequency RFID tag affixed to the product at a second frequency at a second location; and
updating the status in the memory based on the second identification information; and
receiving third identification information from the dual-frequency RFID tag affixed to the product at the first frequency, the second frequency or a third frequency at a third location;
wherein the third identification information includes a patient procedure or final disposition,
wherein updating the status in the memory based on the second identification information includes assigning the product to a scheduled medical procedure.

31. The method of claim 30, wherein the first location, the second location or the third location is a physical location of the product.

32. The method of claim 30, wherein the dual-frequency RFID tag is configured to be suitable for sustained operation in below-freezing or frosty environments.

33. A RFID-enabled enclosure, comprising:
a first RFID reader for reading a first identification information from a dual-frequency radio frequency identification (RFID) tag affixed to a product at a first frequency at a first location;
a first transmitter for transmitting the first identification information to a server which includes an indication the product is a temperature sensitive product;

a second RFID reader for reading a second identification information from the dual-frequency RFID tag affixed to the product at a second frequency at a second location; and a second transmitter for transmitting the second identification information to the server;

wherein the dual-frequency RFID tag is configured to be suitable for sustained operation in below-freezing or frosty environments; and wherein the dual-frequency RFID tag is affixed to the product via an adhesive that is capable of withstanding a cold-storage environment.

34. The RFID-enabled enclosure of claim 33, wherein the first location or the second location is a physical location of the product.

35. The RFID-enabled enclosure of claim 33, wherein the first identification information and the second identification information include same information.

36. A system, comprising:

a memory; and a processor coupled to the memory and configured to execute instructions, wherein the instructions cause the processor to:

receive first identification information from a dual-frequency radio frequency identification (RFID) tag affixed to a product at a first frequency at a first location;

register a status of the product based on the first identification information in the memory which includes an indication with regard to whether the product is a temperature sensitive product;

receive second identification information from the dual-frequency RFID tag affixed to the product at a second frequency at a second location; and update the status in the memory based on the second identification information, wherein the dual-frequency RFID tag is capable of sustained operation in below-freezing or frosty environments, wherein the dual-frequency RFID tag is affixed to the product via an adhesive that is capable of withstanding a cold-storage environment.

37. The system of claim 36, wherein the first frequency is a low frequency (LF) or a high frequency (HF).

38. The system of claim 37, wherein the second frequency is an ultra-high frequency (UHF) or a high frequency (HF).

39. The system of claim 36, wherein the first location is outside a freezer and the second location is inside the freezer.

40. The system of claim 39, wherein the second identification information is received from the freezer that includes a UHF or HF RFID enabled reader.

41. The system of claim 39, wherein the second identification information is received from a handheld UHF or HF RFID enabled reader.

42. The system of claim 36, wherein the first identification information and the second identification information include same information.

43. The system of claim 36, wherein the dual-frequency RFID tag is configured to track cold-chain integrity of the product.

* * * * *